(12) United States Patent
Steever et al.

(10) Patent No.: US 11,209,634 B2
(45) Date of Patent: Dec. 28, 2021

(54) OPTICAL SYSTEM

(71) Applicant: ROBERT BOSCH START-UP PLATFORM NORTH AMERICA, LLC, SERIES 1, Redwood City, CA (US)

(72) Inventors: Audrey Steever, Fremont, CA (US); Nick C. Leindecker, Stanford, CA (US); Kaijen Hsiao, Mountain View, CA (US); Todd Louis Harris, Fremont, CA (US); Edward Solomon, Menlo Park, CA (US); Michael Beebe, Redwood City, CA (US); Sarah Osentoski, Sunnyvale, CA (US)

(73) Assignee: ROBERT BOSCH START-UP PLATFORM NORTH AMERICA, LLC, SERIES 1, Redwood City, CA (US)

( * ) Notice: Subject to any disclaimer, the term of this patent is extended or adjusted under 35 U.S.C. 154(b) by 296 days.

(21) Appl. No.: 16/193,872

(22) Filed: Nov. 16, 2018

(65) Prior Publication Data
US 2019/0155007 A1    May 23, 2019

Related U.S. Application Data

(60) Provisional application No. 62/625,205, filed on Feb. 1, 2018, provisional application No. 62/588,518, filed (Continued)

(51) Int. Cl.
    *G02B 17/08* (2006.01)
    *G02B 27/10* (2006.01)
    (Continued)

(52) U.S. Cl.
    CPC .......... *G02B 17/086* (2013.01); *G01J 1/0411* (2013.01); *G01J 1/0474* (2013.01);
    (Continued)

(58) Field of Classification Search
    CPC .. G02B 17/086; G02B 27/1086; G02B 27/12; G01J 1/0411; G01J 1/0474; G01J 1/42;
    (Continued)

(56) References Cited

U.S. PATENT DOCUMENTS 4,954,962 A    9/1990   Evans, Jr. et al.
5,473,474 A *  12/1995  Powell .................. G02B 13/06
                                             359/725

(Continued)

FOREIGN PATENT DOCUMENTS

WO         0120387 A1    3/2001

*Primary Examiner* — James R Greece
(74) *Attorney, Agent, or Firm* — Brooks Kushman P.C.

(57) ABSTRACT

An optical system includes a splitting optic configured to receive a light beam from a light source and form a set of light bands radiating from the optical system at predetermined angles relative to illuminate a scene. The optical system further includes a lens configured to project a field of view of the scene into a two-dimensional format. The optical system further includes an optical sensor arranged offset from the central axis of the lens to capture a segment of the field of view projected by the lens.

20 Claims, 10 Drawing Sheets

Related U.S. Application Data on Nov. 20, 2017, provisional application No. 62/588,227, filed on Nov. 17, 2017, provisional application No. 62/588,244, filed on Nov. 17, 2017, provisional application No. 62/588,248, filed on Nov. 17, 2017.

(51) Int. Cl.
| | | |
|---|---|---|
| *G02B 27/12* | (2006.01) | |
| *G01J 1/42* | (2006.01) | |
| *G01J 1/04* | (2006.01) | |
| *H04N 5/232* | (2006.01) | |
| *H04N 5/225* | (2006.01) | |

(52) U.S. Cl.
CPC ............ *G01J 1/42* (2013.01); *G02B 27/1086* (2013.01); *G02B 27/12* (2013.01); *H04N 5/2251* (2013.01); *H04N 5/2254* (2013.01); *H04N 5/2256* (2013.01); *H04N 5/23238* (2013.01)

(58) Field of Classification Search
CPC .. H04N 5/2251; H04N 5/2254; H04N 5/2256; H04N 5/23238
USPC .......................................................... 359/618
See application file for complete search history.

(56) References Cited

U.S. PATENT DOCUMENTS

| | | |
|---|---|---|
| 5,725,296 A | 3/1998 | Bibbiani et al. |
| 5,844,638 A | 12/1998 | Ooi et al. |
| 5,914,811 A | 6/1999 | Chen et al. |
| 7,155,308 B2 | 12/2006 | Jones |
| 7,940,377 B1 | 5/2011 | Schmitt et al. |
| 9,489,575 B1 | 11/2016 | Whalen et al. |
| 9,632,505 B2 | 4/2017 | Hickerson et al. |
| 9,753,128 B2 | 9/2017 | Schweizer et al. |
| 10,288,734 B2 * | 5/2019 | Steever .................. G01S 17/04 |
| 2009/0079945 A1 * | 3/2009 | Klosowiak ............. G03B 21/28 353/69 |
| 2011/0305014 A1 | 12/2011 | Peck |
| 2013/0242283 A1 | 9/2013 | Bailey et al. |
| 2014/0118539 A1 | 5/2014 | Ota et al. |
| 2015/0341619 A1 | 11/2015 | Meir et al. |
| 2016/0040982 A1 | 2/2016 | Li et al. |
| 2016/0202846 A1 | 7/2016 | Ferrand et al. |
| 2017/0153319 A1 | 6/2017 | Villeneuve et al. |
| 2017/0184704 A1 | 6/2017 | Yang et al. |

* cited by examiner

OPTICAL SYSTEM

CROSS-REFERENCE TO RELATED APPLICATIONS

This application claims the benefit of U.S. provisional application No. 62/625,205 filed Feb. 1, 2018; U.S. provisional application No. 62/588,518 filed Nov. 20, 2017; U.S. provisional application No. 62/588,227 filed Nov. 17, 2017; U.S. provisional application No. 62/588,244 filed Nov. 17, 2017; and U.S. provisional application No. 62/588,248 filed Nov. 17, 2017, the disclosures of which are hereby incorporated in their entirety by reference herein.

TECHNICAL FIELD

This invention relates generally to the optics field, and more specifically to a new and useful annular imaging system in the optics field.

BACKGROUND

Optical systems can be used in range finding applications, navigation applications, radial metrology applications, laser-based applications, illumination, or other suitable operations.

SUMMARY

An optical system includes a splitting optic configured to receive a light beam from a light source along a first axis and form a set of light bands radiating from the optical system at predetermined angles relative to the first axis to illuminate a scene. The optical system further includes a lens configured to project a field of view of the scene into a two-dimensional format and having a central axis perpendicular to the first axis and offset along a direction of the central axis from the splitting optic. The optical system further includes an optical sensor arranged offset from the central axis of the lens to capture a segment of the field of view projected by the lens.

The optical sensor may be arranged offset from the central axis of the lens such that the segment is less than half of the field of view projected by the lens. The optical system may further include a divider extending between the splitting optic and the lens configured to block direct light transmission from the splitting optics to the lens. The two-dimensional format may be an annular two-dimensional format. An exterior edge of the splitting optic may be aligned with an exterior edge of the lens.

An optical system includes an electromagnetic (EM) wave emitter. The optical system further includes a spreading optic configured to redirect EM waves from the EM wave emitter at a predetermined angle. The optical system further includes a splitting optic configured to receive the redirected EM waves and radiate a set of EM wave bands at predetermined separation angles to illuminate a scene. The optical system further includes an imaging system configured to image the scene encompassing the set of EM wave bands and including a lens and an optical sensor arranged offset from a central axis of the lens such that the optical sensor images a segment of a field of view projected by the lens.

The EM wave emitter may be configured to emit EM waves along a first axis. The predetermined angle may be ninety degrees to the first axis. The o central axis of the lens may be arranged parallel to the first axis. The splitting optic may be arranged with a broad face parallel to a longitudinal axis of the spreading optic. The splitting optic may include a pattern extending perpendicular to the longitudinal axis across the broad face and repeating along an axis parallel to the longitudinal axis. Magnitudes of the predetermined separation angles may be different. The splitting optic may be curved relative to the spreading optic. A curvature of the splitting optic may be less than a curvature of the spreading optic. The optical sensor may be arranged offset from the central axis of the lens such that the segment is less than half of the field of view projected by the lens.

An optical system includes an electromagnetic (EM) wave emitter configured to emit EM waves along a first axis. The optical system further includes a spreading optic configured to redirect the EM waves at a predetermined angle relative to the first axis to form a spread beam. The optical system further includes a splitting optic configured to divide the spread beam into a plurality of beams separated by one or more separation angles to illuminate a scene segment. The optical system further includes an imaging system configured to image a scene encompassing the beams and including a lens and an optical sensor arranged offset from a central axis of the lens such that the optical sensor images a segment of a field of view projected by the lens.

The central axis of the lens may be arranged parallel to the first axis. The imaging system may be located at a vertical position below the splitting optic. The imaging system may be arranged such that an exterior edge of the splitting optic is aligned with an exterior edge of the lens. The optical system may further include a divider extending between the splitting optic and the imaging system configured to block direct light transmission from the splitting optic to the lens. The optical sensor may be arranged offset from the central axis of the lens such that the segment is less than half of the field of view projected by the lens.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

1. Optical system.

Figure 1:
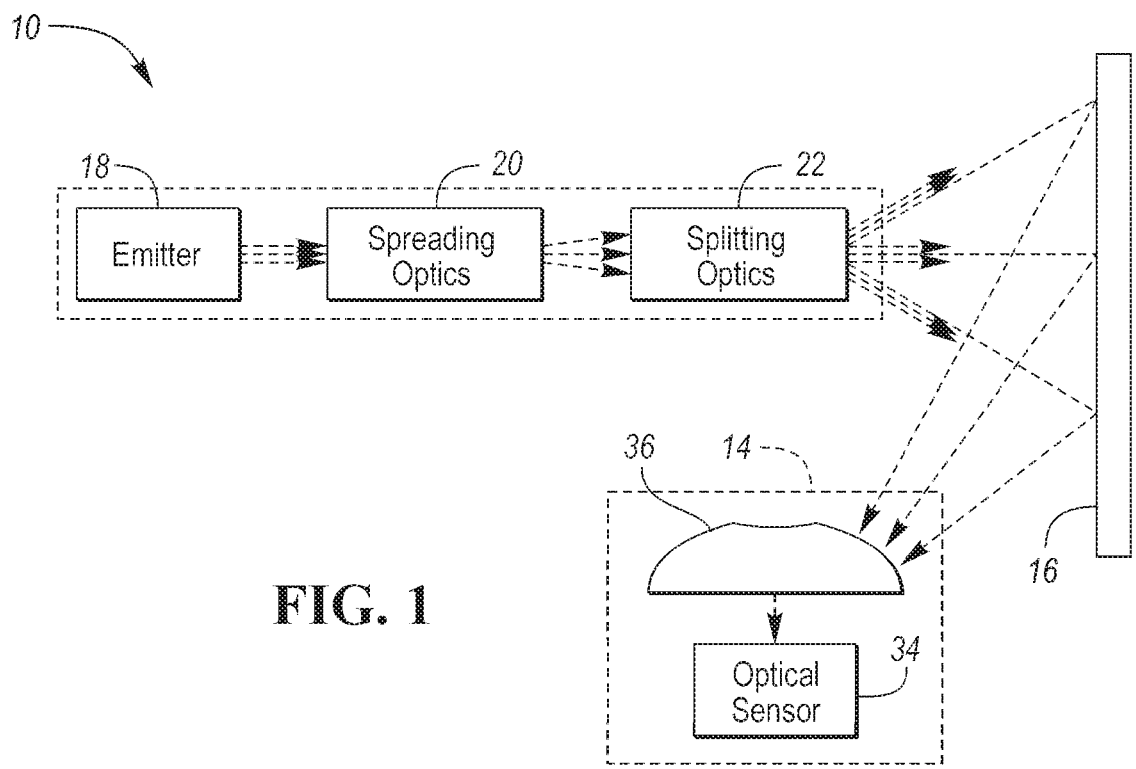
FIG. 1 is a schematic representation of the optical system.

As shown in FIG. 1, optical system 10 includes illumination system 12 and imaging system 14. Optical system 10 functions to illuminate and image scene 16. In certain embodiments, optical system 10 radially illuminates a lateral scene segment (e.g., using radial rays), and samples a flat, annular image of illuminated scene 16. In a specific example, optical system 10 forms a set of light bands (e.g., sheets) from a single light source, each band radiating at a different angle from optical system 10, and images a scene encompassing all light bands of the set.

Optical system 10 can be used in range finding applications, navigation applications, radial metrology applications, laser-based applications, illumination, or in any other suitable application. In operation, the emitted light intensity, light wavelength, light polarization, and/or shutter speed can be controlled. Additionally, or alternatively, the sheet angle, imaged field of view, or other optical parameter can be controlled.

Figure 2:
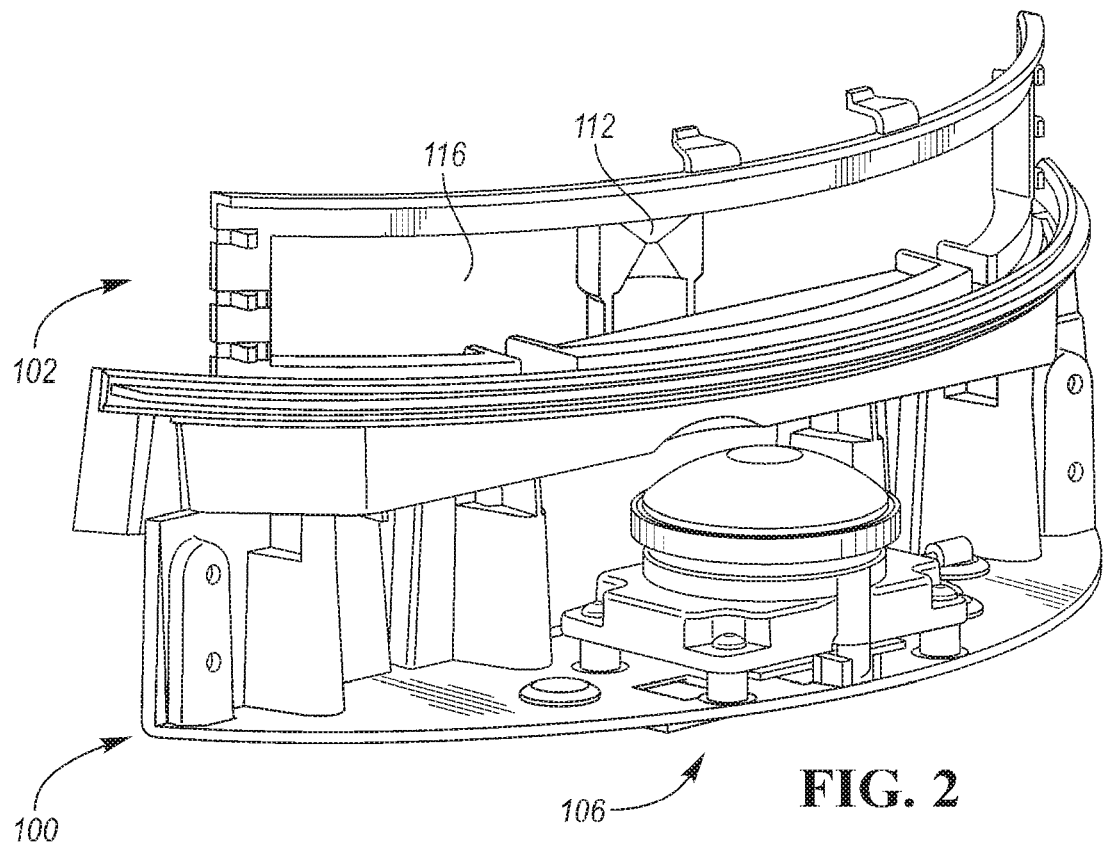
FIG. 2 is an isometric view of an example of the optical system.
Figure 3:
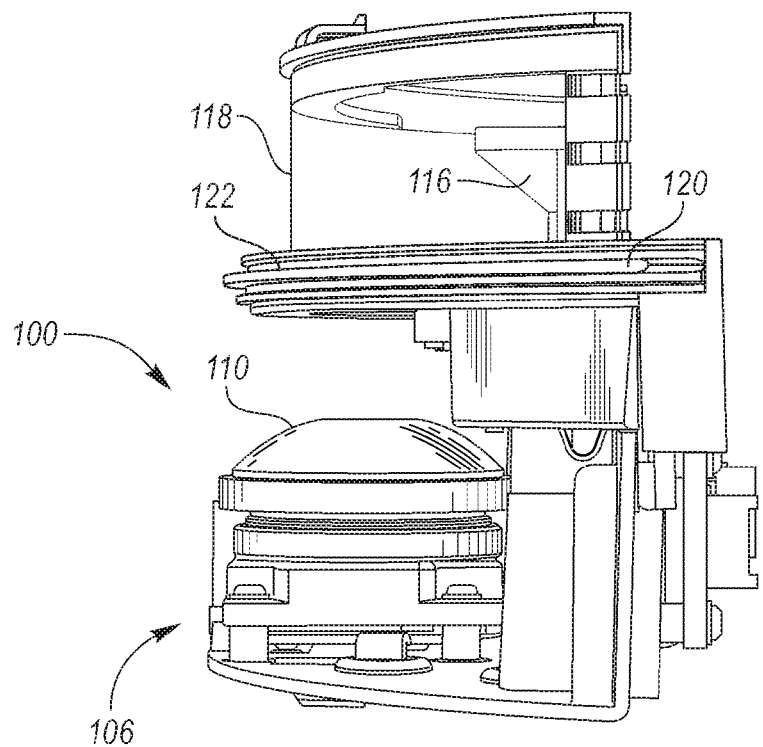
FIG. 3 is a side view of the example of the optical system with a housing.
Figure 4:
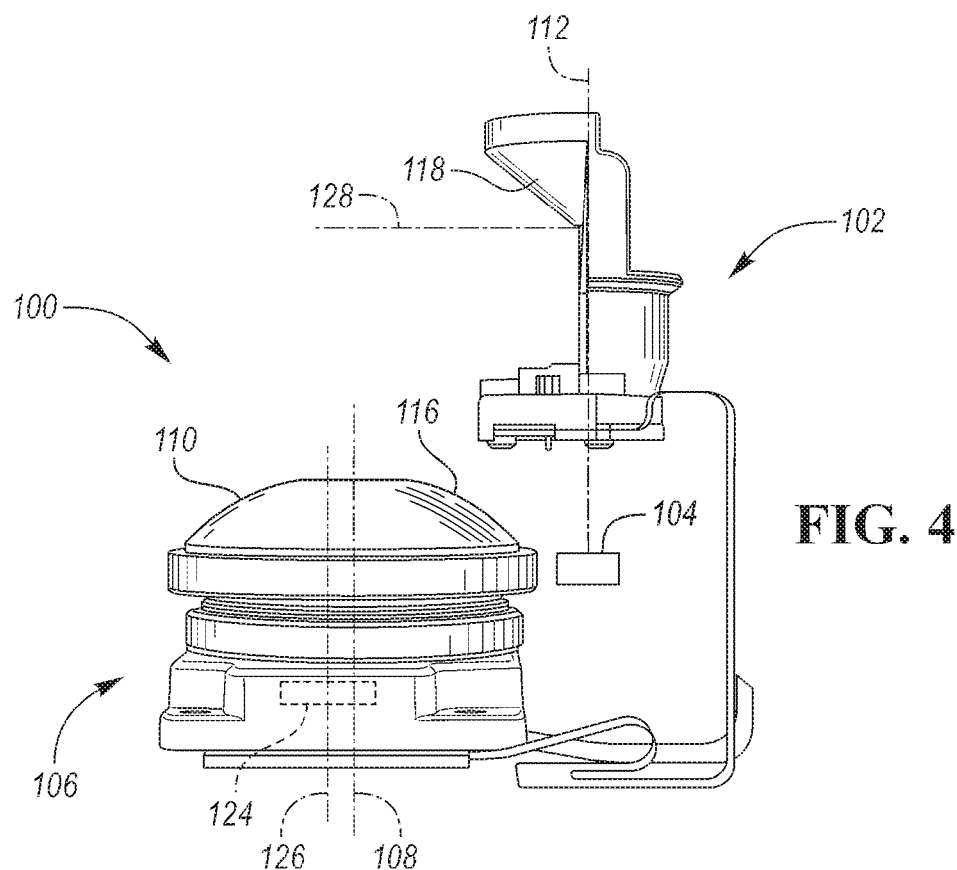
FIG. 4 is a side view of the example of the optical system with imaginary axes.

In one variation of optical system 100, shown in FIG. 2, FIG. 3, and FIG. 4, illumination system 102 is oriented with emitter 104 facing upward (e.g., in the positive z direction), wherein the output beams (illumination beam) extend perpendicular the z-axis (pass-through vector) on illumination axis 128 or at an angle to the passthrough vector. Imaging system 106 is oriented with central axis 108 of lens 110 arranged parallel emission axis 112 (e.g., the z-axis) of emitter 104. Imaging system 106 can be arranged below illumination system 102, with first refractive surface 116 (e.g., top) of lens 110 proximal emitter 104, above illumination system 102, with first refractive surface 116 (e.g., top) of lens 110 proximal spreading optic 114, or otherwise arranged. Imaging system 106 can be arranged with the exterior edge of splitter optic 118 of illumination system 102 aligned with the exterior edge of lens 110 in the x-axis and arranged with central axis 108 of lens 110 aligned with the central axis of splitter optic 118 in the y-axis. Alternatively, lens 110 can be arranged with central axis 108 of lens 110 aligned with the longitudinal axis of spreading optic 114, or otherwise aligned with illumination system 102.

This embodiment may include housing 120 that mounts illumination system 102 and imaging system 106. In one embodiment, housing 120 includes divider 122 extending between illumination system 102 and the imaging system 106 (e.g., in the x/y plane). Divider 122 can block direct light transmission from illumination system 102 to imaging system 106. Divider 122 extends as far as, or several inches past, splitter optic 118, but can have any suitable dimension. Divider 122 can optionally double as a mounting support for splitter optic 118. Divider 122 and/or housing 120 can be opaque but can alternatively be translucent or have any suitable optical property. Imaging system 106 can be arranged a predetermined distance away from divider 122 but can be arranged at any other suitable position. The predetermined distance can be: the lens diameter, lens radius, calculated from the light wavelength, or otherwise determined. In a specific example, housing 120 can be black, which can function to reduce noise in the signal projected by lens 110.

In this embodiment, lens 110 can be at least partially recessed within housing 120. In this embodiment, central axis 126 of optical sensor 124 can be arranged offset from central axis 108 of lens 110, such that optical sensor 124 images a segment of the field of view (FOV) projected by lens 110 (e.g., a forward segment of the projected FOV), but can alternatively be coaxially aligned with lens 110 (e.g., image the entirety or majority of the projected FOV), or be otherwise aligned. In one embodiment, optical sensor 124 is arranged offset lens axis 108 such that optical sensor 124 images half (e.g., a semicircle) or less of the projected FOV. Alternatively, lens 110 can be entirely exposed or otherwise arranged relative to the housing.

2. Illumination System.

Figure 5:
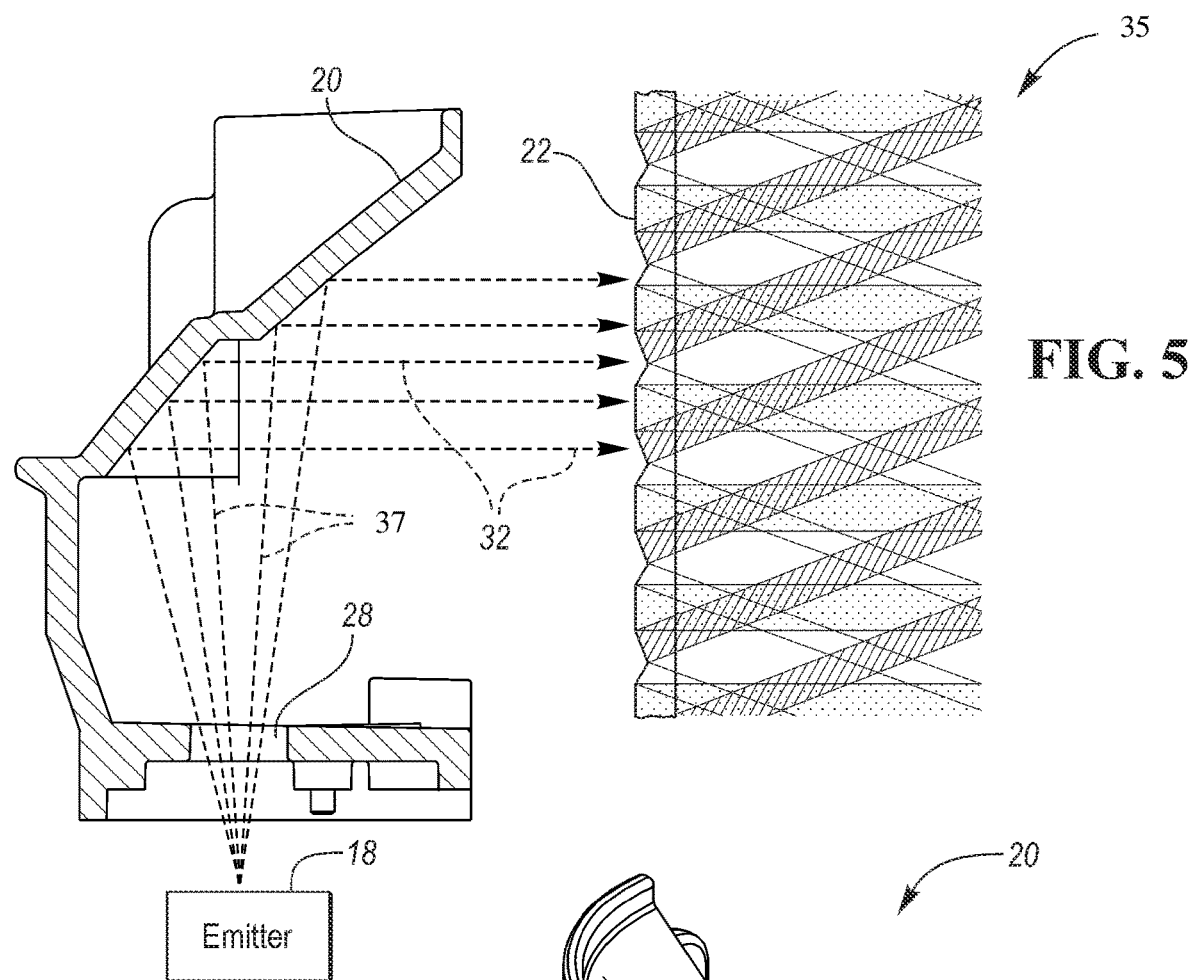
FIG. 5 is an example of the illumination system in operation.

As shown in FIG. 5, illumination system 10 can include: emitter 18, spreading optic 20, and splitter optic 22. Illumination system 102 of optical system 10 functions to illuminate scene 16. Illumination system can split source light (e.g., light emitted by a light source) into a set of light sheets, where each light sheet is at a non-zero angle to another light sheet of the set. Additionally, or alternatively, illumination system 102 can redirect and/or shape the source light (e.g., change the angle of the source light). Illumination system 102 can be axially symmetric, but can alternatively be radially symmetric, asymmetric, partially offset, or have any suitable symmetry.

In one embodiment, emitter 18 is arranged perpendicular a longitudinal axis (e.g., alignment axis) of spreading optic 20, and aligned with the interface between first and second reflective surfaces 24 and 26, such that light emitted by emitter 18 is substantially evenly incident on first and second reflective surfaces 24 and (e.g., 50/50 respectively, 40/60 respectively, etc.). In other embodiments, emitter 18 may be aligned with emitter aperture 28 of spreading optic 20 but can be otherwise arranged.

In this embodiment, splitter optic 22 is arranged with a broad face parallel the longitudinal axis of spreading optic 20, with the pattern (e.g., lines) of splitter optic 22 extending perpendicular the longitudinal axis across the broad face and repeating along an axis parallel the longitudinal axis.

As shown in FIG. 2 and FIG. 3, splitter optic 118 is curved relative to spreading optic 114 but can be flat or otherwise arranged. The curvature of splitter optic 118 may be several times smaller than the curvature of spreading optic 114 (e.g., 5×, 10×, 100×, etc.), but can alternatively be equal or larger. Spreading optic 114 can be aligned with the center of splitter optic 118, offset from the center of splitter optic 118 (e.g., arranged with the center of spreading optic 114 lower or higher than the center of splitter optic 118), or otherwise arranged. The separation distance between the spreading optic 114 and splitter optic 118 can be: arbitrary, super-wavelength, a function of the subpattern dimensions, a function of the input beam wavelength, or otherwise determined.

A. Emitter

Emitter of the illumination system functions to emit electromagnetic waves, which are subsequently reshaped by the spreading optic and splitter optic. The electromagnetic waves are preferably light, but can alternatively be any other suitable electromagnetic (EM) wave. The light is preferably IR light, more preferably near-IR between 840 nm-860 nm, such as 850 nm, but can alternatively be mid-infrared, far infrared, UV, or any other suitable light. The light can be amplitude-modulated (e.g., at a frequency between 1 kHz-100 kHz, multiple frequencies over time or concurrently, etc.), phase-modulated, unmodulated, or have any suitable structure. The emitter preferably emits EM rays (e.g., light rays) along an emission vector, but can alternatively or additionally emit rays along an arcuate segment relative to the emission vector (e.g., within 20°, 30°, 45°, 60°), or emit rays in any suitable direction. The emitter preferably emits a beam, but can alternatively emit a sheet (e.g., arranged perpendicular or parallel a spreading optic's redirection vector), structured light (e.g., a dot matrix, a linear array, etc.), or emit light having any suitable configuration. The emitter preferably emits collimated light, but can alternatively emit diffuse light. The emitter preferably includes a laser LED or array thereof, but can alternatively include an OLED array, incandescent light, or any other suitable set of light emitting elements. The illumination system can include one or more emitters arranged in an array, a strip, or in any other suitable configuration.

B. Spreading Optic

As shown in FIG. 1, spreading optic 20 of illumination system 12 functions to spread electromagnetic waves emitted by emitter 18. Spreading optic 20 (otherwise referred to as a luminaire) may evenly distribute the electromagnetic waves (EM waves) along a predetermined axis or region, but may alternatively or additionally unevenly distribute the EM waves, distribute the EM waves in a pattern (e.g., predetermined, dynamically determined, etc.), or distribute the EM waves in any suitable manner. The rays of the distributed EM waves may be parallel to each other but may alternatively be divergent or convergent. Spreading optic 20 can optionally function to redirect the EM waves at a predetermined angle to an emission vector (e.g., a principal emission vector) (e.g., 20°, 30°, 45°, 60°, 90°, 135°, etc. to the emission vector).

Spreading optic 20 may distribute the EM waves along a first axis and a plane perpendicular the first axis (e.g., encompassing a second and third axis), but can alternatively distribute the EM waves along the first axis only, the second or third axis only, the plane only, or along any suitable set of: axes, plane(s), or redirection vector(s). The first axis may be parallel the emission vector of emitter 18 but may alternatively be perpendicular the emission vector or arranged at any suitable angle to the emission vector. The plane may be parallel the emission vector of emitter 18 but may alternatively be at any suitable angle to the emission vector. In one example, spreading optic 20 spreads the emitter's vertical light beam (e.g., emitted along the z-axis) both vertically (e.g., along the z-axis) and horizontally (e.g., along the x/y-plane), to form a horizontal light band thicker than a vertical (e.g. z-axis) light beam. The resultant light band may be substantially uniform (e.g., the band's optical parameters, such as amplitude, wavelength, frequency, irradiance, or other parameters, are substantially the same at all points at a predetermined distance from the spreading optic), but can alternatively be non-uniform, irregular, structured, or otherwise configured. However, spreading optic 20 can generate any suitable EM wave distribution. In one or more embodiments, a focusing or diverging optic can be situated between emitter 18 and the reflective surfaces 24, 26 (FIG. 6) of spreading optic 20. The focusing optic can be configured to pre-collimate the light beam or EM waves emitted by emitter 18 before it reaches the reflective surfaces 24, 26 of spreading optic 20. A diverging optic (e.g. negative lens) between emitter 18 and spreading optic 20 can be used to diverge the light beam or EM waves emitted by emitter 18 before it reaches the reflective surfaces 24, 26 of spreading optic 20. In further embodiments, a mirror (e.g. fold mirror) between emitter 18 and the spreading optic 20 can be used to redirect the light beam or EM waves emitted by emitter 18 before it reaches the reflective surfaces 24, 26 of spreading optic 20, thereby allowing convenient orientation or placement of the emitter 18. Such fold mirror may be planar or may be concave or convex to decrease or increase respectively the emission beam divergence, and may further be used to adjust the alignment between the emitter 18 and spreading optic 20 either manually (e.g. at manufacturing alignment, or for servicing) or dynamically.

Spreading optic 20 may be made from a single unitary piece (e.g., using injection molding, CNC machining, 3D printing, etc.), but can alternatively be constructed from multiple pieces. Spreading optic 20 and/or arrangement may be static but may alternatively be actuatable. In the latter example, the axial or lateral position of spreading optic 20 relative to emitter 18 (and/or secondary optics, such as splitter film or splitting optics 22) may be dynamically adjusted (e.g., by a motor, linear adjustment system, etc.). Additionally, or alternatively, the curvature of the reflective surfaces 24, 26 of spreading optic 20 may be dynamically adjusted, such as by using shape-memory material (e.g., Nitinol), a mechanical actuator, or any other suitable adjustment mechanism. The body of spreading optic 20 may be opaque but can alternatively be translucent or transparent. Spreading optic 20 body may be black or be any suitable color, or may be absorbing at any desired wavelength(s). The reflective surfaces 24, 26, 30 (FIG. 8) of spreading optic 20 may be at least 85% reflective at the wavelengths emitted by emitter 18 (e.g., 850 nm), but may alternatively have a higher or lower reflectance at any suitable wavelength. The properties (e.g. reflectance, absorbance, etc.) of the reflective surfaces 24, 26, 30 of spreading optic 20 may vary spatially or temporally (e.g. modulated). The reflectance of the reflecting surfaces 24, 26, 30 may be conferred as a function of the material selection, by using optical coating(s) (e.g., protected aluminum), mechanically (e.g. orienting surfaces such that incident light strikes at angles equal to or greater than the critical angle of incidence for refraction per Snell's Law), or otherwise obtained. The surface roughness of the reflective surfaces can preferably be less than 75 angstroms RMS or have any suitable surface roughness. The reflective surfaces 24, 26, 30 of spreading optic 20 may be first-surface mirrors where the light reflects off the outer surface of the optic but can alternatively be second-surface mirrors where the input rays strike and reflect off an internal surface. The bodies of the second-surface mirrors may be made of a broadly transparent optical material but may alternatively be made of a material that is selectively transparent at the wavelengths emitted by emitter 18 and absorbent at other wavelengths.

Figure 6:
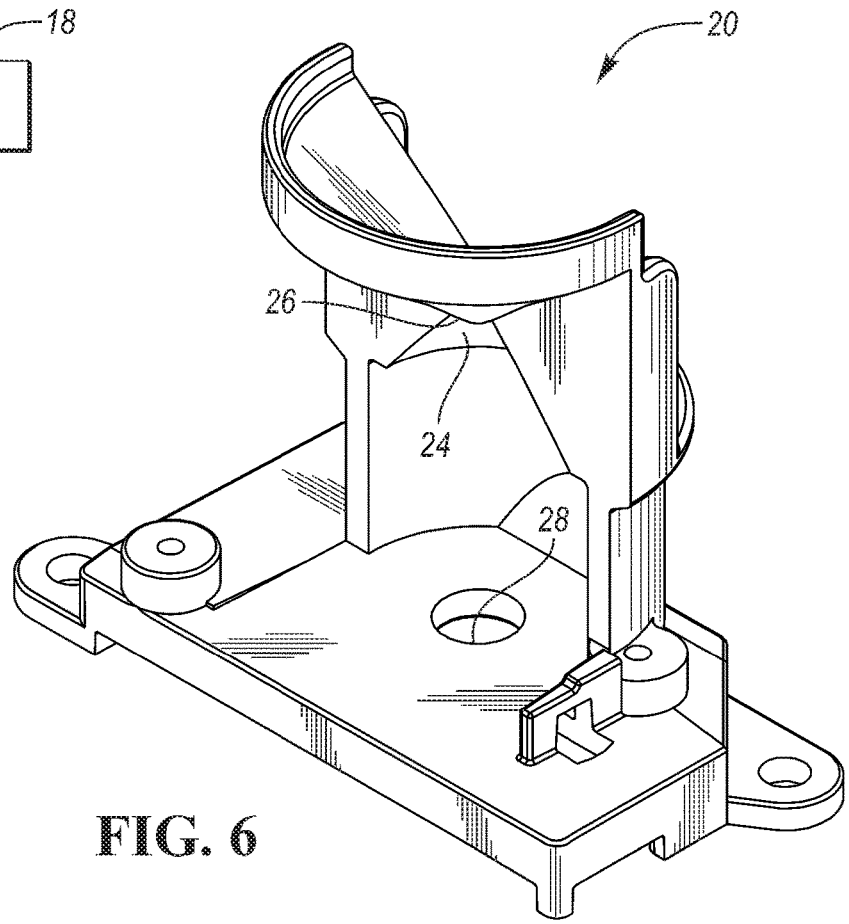
FIG. 6 is an example of the spreading optic.
Figure 7:
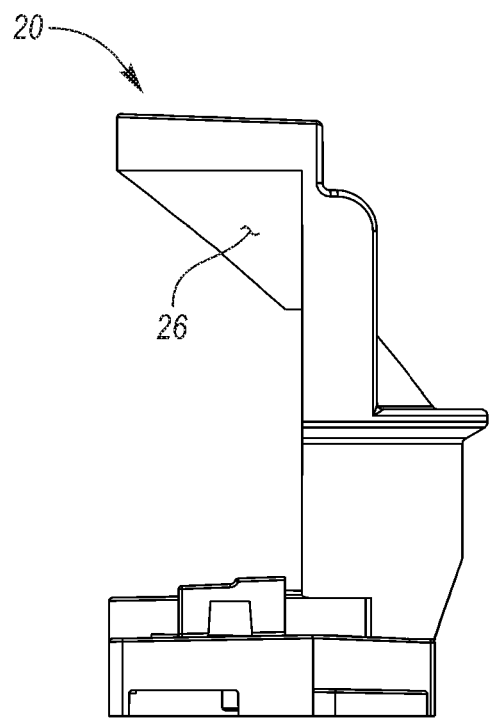
FIG. 7 is a side view of the example of the spreading optic.
Figure 8:
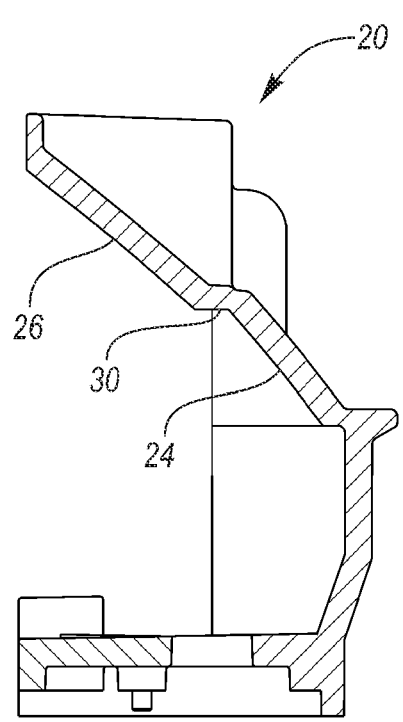
FIG. 8 is a cutaway view of the example of the spreading optic.
Figure 10:
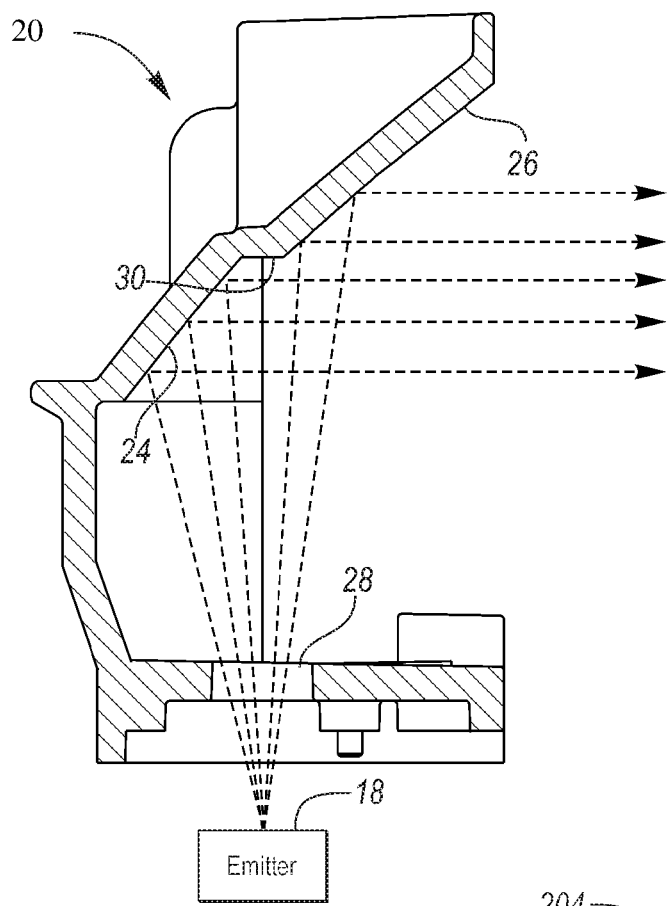

In one embodiment, shown in FIG. 6, FIG. 7, and FIG. 8, spreading optic 20 includes first reflective surface 24, second reflective surface 26, and third reflective surface 30 joining the first and second surfaces 24 and 26. In operation, emitter 18 is positioned substantially along the common axis of and before the reflective surfaces 24 and 26, and light rays emitted by the emitter 18 reflect off first and second reflective surfaces 24 and 26 to form a redirected light band. In one embodiment as shown in FIG. 10), reflective surfaces 24 and 26 may function as a convex mirror in the cross-section plane containing the (hence pseudo-conical) reflectors' axes in which rays reflecting off first reflective surface 24 are reflected in a pseudo-collimated fan away from first reflective surface 24 (e.g., at an angle perpendicular the emission vector and/or parallel the emitter exit face). Rays incident on second reflective surface 26 (arranged after the first reflective surface 24) are likewise reflected in a pseudo-collimated fan away from second reflective surface 26 (e.g., at an angle perpendicular the input beam axis and/or parallel the emitter 18 exit face). Rays incident on third reflective surface 30 (between the first and second reflective surfaces 24 and 26) can be reflected toward first or second reflective surface 24 and 26, diffused, absorbed, or have any suitable path. Alternatively, the third reflective surface 30 may be omitted and replaced by an aperture or transparent section thereby allowing a portion of the emission beam to pass through the spreading optic body for other use (e.g. emission monitor detection; subsequent redirection for other purpose; dumping; etc.). Surface 30 may alternatively be absorbing.

One or more of reflective surfaces 24, 26, and 30 are preferably smooth, but can alternatively be textured or have other optical features. The reflective surfaces may be mirrored but can be frosted or have any other suitable reflectance. The reflective material, finish, or other parameters of the reflective surface(s) may be selected to maximize reflected light at the wavelength of emitter 18 but can be otherwise selected. Non-limiting examples of the material include: aluminum, silver, gold, or any other suitable material or combination thereof. In a specific example, reflective surfaces 24, 26, and 30 are formed by a reflective coating, and the coating can include protected aluminum, with a reflectance over 85% at 850 nm.

First reflective surface 24 functions to reflect light along a vector fan substantially perpendicular to a cylindrical surface (e.g. redirect vector 90° relative to input beam axis) or to a conical surface (e.g. redirect vector other than 90° relative to input beam axis) having its axis parallel to the input beam axis. First reflective surface 24 (e.g., the reflective surface proximal of emitter 18) may be a straight cross section segment in a first plane shared by the input beam axis (e.g., in the x/z and/or y/z planes) but can alternatively be concave or convex. First reflective surface 24 may a concave cross section in a second plane perpendicular the first plane (e.g., perpendicular the input beam axis; in the x/y plane), such that first reflective surface 24 preferably forms a concave mirror, but can alternatively be convex or have any suitable shape.

In one embodiment of first reflective surface 24, the geometry of first reflective surface 24 may be aspheric (e.g. compound or rotationally symmetric) but can alternatively be spherical. The geometry of first reflective surface 24 may be the interior of a conic or frustum slice (e.g., be a concave surface curved in a plane cross-section perpendicular the conic axis), but can alternatively be the interior surface of a cylindrical section (e.g., cylinder, ungula of a cylinder, etc.), or have any other suitable geometry. First reflective surface 24 may be a slice of a circular cone (e.g., be a hemicone), or a slice of a right circular cone, but can alternatively be a slice of an oblique circular cone, elliptic cone, truncated cone (e.g., frustum), or any other suitable conic form. The right circular cone may be an isosceles cone (e.g., wherein the radius is the same as the cone height, wherein the angle between a generatrix and the base is 45°) but can alternatively be any other suitable cone type (e.g., wherein the angle between the generatrix and the base can be any suitable angle, such as 30°, 45°, etc.). The conic slice may be sliced perpendicular the conic base but can alternatively be sliced at an oblique or acute angle to the conic base. The conic slice may be through the conic apex, but can alternatively be offset from the conic apex, extend along the conic axis, or be otherwise aligned. In a specific example, the first reflective surface can have SAG values (e.g., the axial component of the displacement of the surface from the vertex, at a given distance from the conic axis or vertex) ranging from approximately −7.59 at 0.8 mm from the vertex to −1.725 at 7.9 mm from the vertex. However, the first reflective surface can have any suitable range of SAG values. In this variation, the interior of the conic slice may be smooth but can have any other suitable configuration.

First reflective surface 24 may be arranged with the apex arranged distal the emitter (e.g., along the emitter vector; with the base arranged proximal the emitter) but can be otherwise arranged.

Second reflective surface 26 functions to reflect light along a vector fan substantially perpendicular a cylindrical surface (e.g. redirect vector 90° relative to input beam axis) or to a conical surface (e.g. redirect vector other than 90° relative to input beam axis) having its axis parallel to the input beam axis. Second reflective surface 26 (e.g., the reflective surface distal of emitter 18) may have a straight cross section segment in a first plane shared by the input beam axis (e.g., in the x/z and/or y/z planes) but can alternatively be concave or convex. Second reflective surface 26 may have a convex cross section in a second plane perpendicular the first plane (e.g., perpendicular the input beam axis; in the x/y plane), such that second reflective surface 26 preferably forms a convex mirror, but can alternatively be concave or have any suitable shape.

In one embodiment of second reflective surface 26, the geometry of second reflective surface 26 may be aspheric (e.g. compound or rotationally symmetric) but can alternatively be spherical. The geometry of second reflective surface 26 may be the exterior of a conic or frustum slice (e.g., be a convex surface curved in a plane cross-section perpendicular the conic axis), but can alternatively be the interior surface of cylindrical section (e.g., cylinder, ungula of a cylinder, etc.), or have any other suitable geometry. Second reflective surface 26 may be a slice of a circular cone (e.g., be a hemicone), or a slice of a right circular cone, but can alternatively be a slice of an oblique circular cone, elliptic cone, truncated cone (e.g., frustum), or any other suitable conic form. The right circular cone is preferably an isosceles cone (e.g., wherein the radius is the same as the cone height, wherein the angle between a generatrix and the base is 45°) but can alternatively be any other suitable cone type (e.g., wherein the angle between the generatrix and the base can be any suitable angle, such as 30°, 45°, etc.). The conic slice may be sliced perpendicular the conic base but can alternatively be sliced at an oblique or acute angle to the conic base. The conic slice may be through the conic apex, but can alternatively be offset from the conic apex, extend along the conic axis, or be otherwise aligned. In a specific example, second reflective surface 26 can have SAG values (e.g., the axial component of the displacement of the surface from the vertex, at a given distance from the conic axis or vertex) ranging from approximately 3 at 1.54 mm from the vertex to 12.8 at 9.53 mm from the vertex. However, second reflective surface 26 can have any suitable range of SAG values. In this variation, the exterior of the conic slice is preferably smooth but can have any other suitable configuration.

The first and second cones (from which first and second reflective surfaces 24 and 26 are slices) can have the same dimensions (e.g., height, radius, etc.).

Second reflective surface 26 may be arranged with the apex proximal emitter 18 (e.g., along the emitter vector; with the base arranged distal emitter 18) and/or the apex proximal the apex of first reflective surface 24 but can be otherwise arranged. Second reflective surface 26 may be arranged with its reflective surface facing the same direction as the reflective surface of first reflective surface 24, a direction at an angle to first reflective surface 24, or at any suitable angle. Second reflective surface 26 may be laterally and axially offset from first reflective surface 24 (e.g., by third reflective surface 30), but can be otherwise arranged. First reflective surface 24 and second reflective surface 26 may be arranged with the respective conical axes arranged in parallel along an alignment axis but can alternatively be arranged with the conical axis of second reflective surface 26 at an angle to the conical axis of first reflective surface 24 (e.g., ±10°, 20°, etc.). The conical axes of first and second reflective surfaces 24 and 26 may be preferably parallel the emission vector and/or emitter normal (e.g., normal vector of the emitter's exit face), but can alternatively be at an angle (e.g., positive, toward the redirection vector; negative away from the redirection vector). The angle can be predetermined (e.g., based on the desired illumination angle, such as 90° from the desired illumination angle), dynamically selected, or otherwise determined.

Third reflective surface 30 may function to mechanically join first and second reflective surfaces 24 and 26, and can optionally reflect, transmit, or absorb light, or be omitted entirely. Third reflective surface 30 can reflect light toward emitter 18, reflect light away from spreading optic 20 (e.g., along the redirection vector), or reflect light in any suitable manner. Additionally, or alternatively, third reflective surface 30 can reflect or transmit a fraction of the emitter output to any appropriate kind of optical sensor (e.g., photosensor, the optical sensor of an imaging system, etc.), which can be used to monitor or provide feedback on the emitter output or serve any other suitable function.

Third reflective surface 30 may be flat, but can alternatively be curved (e.g., in the first plane shared by the emitter's emission vector, in the second plane perpendicular the first plane, etc.). The externt of third reflective surface 30 (e.g., extending from first reflective surface 24 to second reflective surface 26) may be less than 10% of the base radius or radii of first and/or second reflective surfaces 24 and 26, but can alternatively have any suitable value.

Third reflective surface 30 may be arranged perpendicular the conic axis or alignment axis (e.g., extends horizontally, along the x/y plane, between first and second reflective surfaces 24 and 26), but can alternatively extend parallel the alignment axis, extend at an angle to the alignment axis, or be otherwise arranged.

Figure 9:
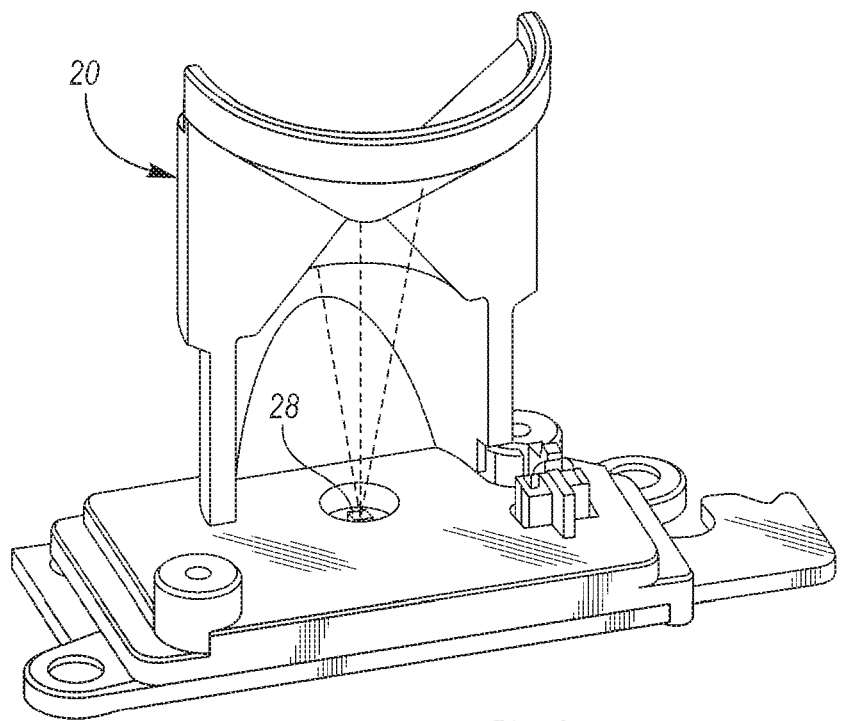
FIGS. 9 and 10 are an isometric and cutaway view of a spreading optic example's alignment with an emitter.

Spreading optic 20 may include emitter aperture 28 that functions to permit and to partially limit light egress from emitter 18 to first, second, and/or third reflective surfaces 24, 26, and 30, example shown in FIG. 6 and FIG. 9. Alternatively, the emitter aperture 28 may be separate from the spreading optic 20 body (e.g. integral with a separate emitter mount; an alignable part or assembly). Emitter aperture 28 may be an unobstructed through-hole, but can alternatively or additionally include a filter, lens, or any other suitable optical element. Emitter aperture 28 may be circular, but can alternatively be a circle segment, a circle sector, be triangular, or have any suitable geometry. Emitter aperture 28 may have the same diameter throughout, but can alternatively have a variable diameter (e.g., convergent, divergent, or both toward the spreading optic), a textured bore, or be otherwise constructed. The diameter of emitter aperture 28 can be equal to the extent of third reflective surface 30 but can alternatively be larger or smaller.

Emitter aperture 28 can be arranged with the central axis aligned with (e.g., parallel, coaxial) the emission axis, but can be arranged with the central axis at a predetermined angle (e.g., 10°, 45°, etc.) the emission axis. The predetermined angle can be the angle at which the alignment axis is arranged relative to the emission axis or can be any other suitable angle.

Emitter aperture 28 may be aligned with third reflective surface 30. In one example, the central axis of the emitter aperture 28 is aligned with the central axis of third reflective surface 30 (example shown in FIG. 10). However, emitter aperture 28 can be aligned with first or second reflective surfaces 24 and 26 (e.g., with an aperture edge or central axis aligned with the top or smaller section of the respective reflective surface), or otherwise arranged. In a specific example, emitter aperture 28 is aligned such that at least 90% of an emitter aperture projection area onto third reflective surface 30 plane overlaps third reflective surface 30, wherein the remaining portion of the projection overlaps first and/or second reflective surfaces 24 and 26. In a second specific example, emitter aperture 28 is aligned such that at least 90% of the projection area of third reflective surface 30 onto the plane of emitter aperture 28 overlaps emitter aperture 28.

In an example as shown in FIG. 9, spreading optic 20 includes a first hemiconicular concave reflector (e.g., first reflective surface 24) and a second hemiconicular convex reflector (e.g., second reflective surface 26), each hemicone including an apex, wherein the first and second hemicones are arranged with the respective conic axes aligned along an alignment axis and with proximal apexes aligned along a common plane. The first hemicone is arranged with an interior (concave) surface directed in a first direction (e.g., forward; aligned along a redirection axis perpendicular an alignment axis; etc.) and the second hemicone is arranged with an exterior (convex) surface directed in the first direction (e.g., forward). The spreading optic 20 can optionally include a flat reflective surface (e.g., third reflective surface) joining the apexes of the first and second hemicones and extending along the common plane, wherein the flat reflective surface is arranged with a normal vector parallel the emission vector of emitter 18. Emitter 18 of illumination system 12 may be located proximal the first hemicone, with an exit face arranged perpendicular the hemicones' alignment axis.

In a specific example, first reflective surface 24 has a height of 8.48 mm; second reflective surface 26 has a height of 10.18 mm and a radius of 13.65 mm; and emitter 18 is arranged with an active surface 19.31 mm away from the base of the first reflective surface.

C. Splitter Optic

Splitter optic 22 functions to divide input beam 32 into one or more beams 35, separated by one or more angles of separation (separation angles). Splitter optic 22 can optionally polarize output beam 35, function as a waveguide, or perform any suitable functionality in addition to splitting the input beam 32. Splitter optic 22 can be used in illumination system 12, which can be used in imaging system 14 (e.g., range finding system). However, splitter optic 22 can be used in optical system 10. Illumination system 12 can include a single splitter optic, multiple splitter optics (e.g., stacked along the illumination vector, stacked perpendicular the illumination vector, etc.), or include any suitable number of splitter optics.

Input beam 32 may be derived from a single light source (e.g., emitter, emitter-spreading optic pair), but can alternatively be formed from multiple light sources, a pre-splitter optic(s) local to the emitter, or any suitable set of light sources. In a specific example, input beam 32 includes a spread beam generated by reflecting source beam 37 off spreading optic 20. However, input beam 32 can be otherwise generated. Input beam 32 may be convergent but can alternatively be divergent. In some examples, the input beam 32 may be spread to predetermined beam widths and subsequently collimated. Input beam 32 may be unpolarized but can alternatively be polarized. Input beam 32 can be monochromatic (e.g., 850 nm), but can alternatively be multichromatic (e.g., white light) or have any suitable chromacity or wavelength.

Figure 11:
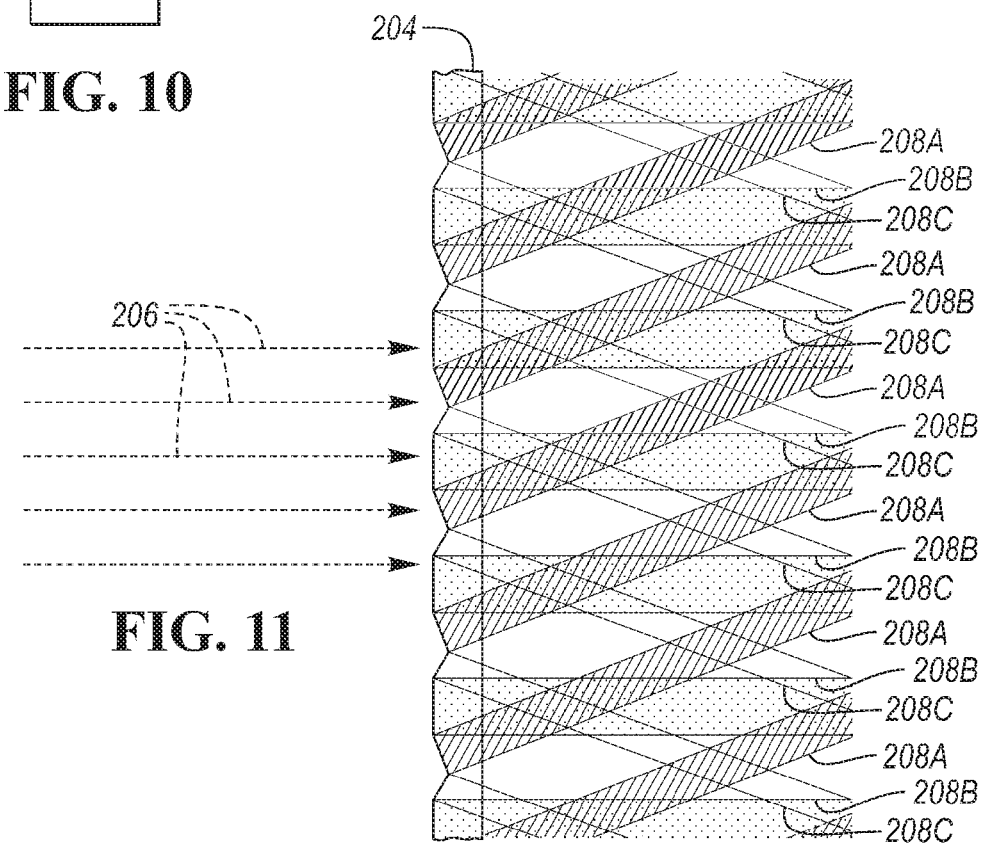
FIG. 11 is an example of the splitting optic in operation.

FIG. 11 depicts an example of the splitter optic 204 in operation. The output beam(s) 208 may have the same distribution and set of wavelengths as the input beam 206. The output beam(s) 208 can also have a different divergence angle, diameter, radiance, intensity, polarization, and phase from the input beam 206. In one variation, the radiance per output beam 208 may be determined based on the splitter optic's 204 surface area having the associated separation angle (e.g., the percentage of light directed into a +45° beam is the percentage of the projected area of the splitter optic 204 having an angle that is +45° from the input beam vector). Alternatively, or additionally, the radiance distribution can be determined based on the duty cycle between the angled surfaces (e.g., etchings) or otherwise determined. However, the output beam parameters can have different optical parameters from the input beam 206 or be otherwise related to the input beam parameters. The output beams 208 may be 1-dimensional beams (e.g., linear beams), but can alternatively be a 2-dimensional beam (e.g., complex pattern), or have any suitable set of dimensions. The microstructure may be linear, but can alternatively be obloid, rectangular, or have any suitable geometry. The beam cross section can be obloid, rectangular, or have any suitable geometry.

Figure 12:
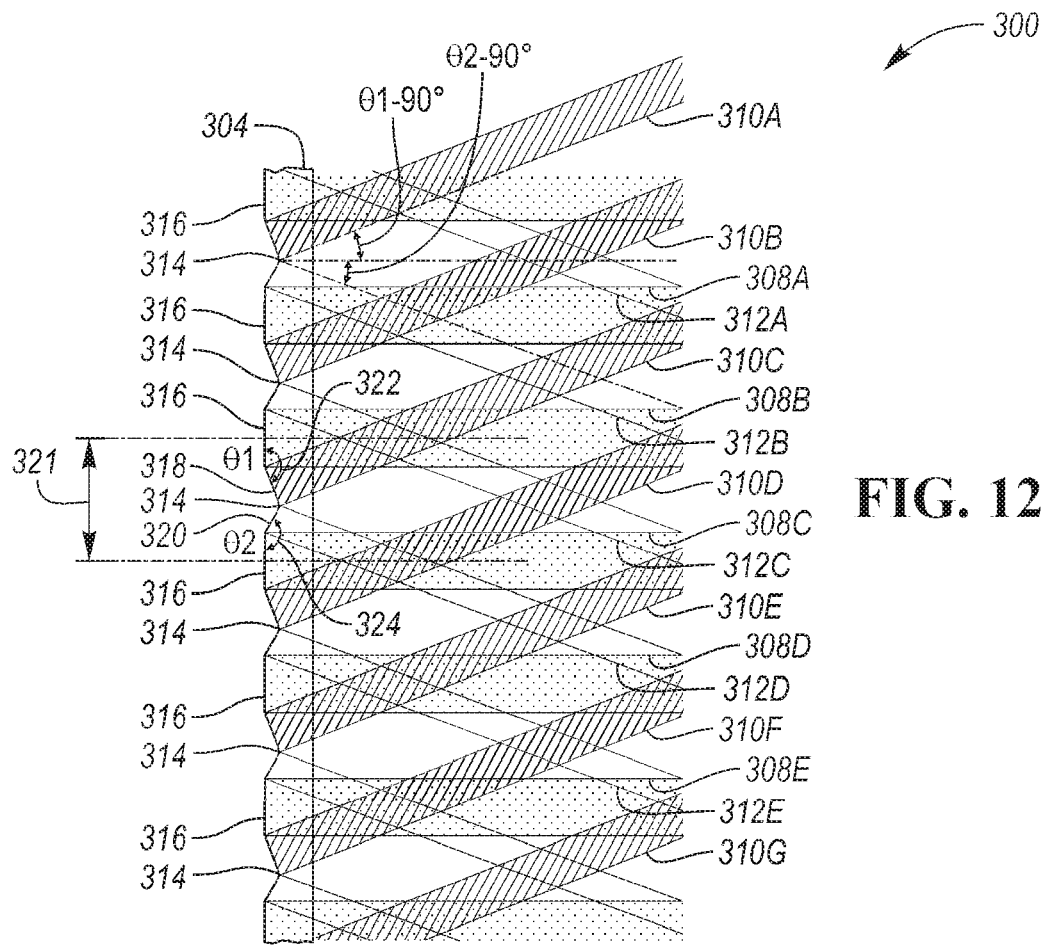
FIG. 12 is an example of the splitting optic configured to produce a passthrough beam, a beam at a positive angle, and a beam at a negative angle.

In a first variation 300, a splitter optic 304 redirects a portion of an input beam into a first set 308 of output beams having the same output angle (e.g., relative to the input beam vector), example shown in FIG. 12. The first set 308 of output beams may be divergent, such that the first set 308 of output beams cooperatively form a band (having the output angle) a range of predetermined distances from the splitter optic 304. A band of light may be defined as a composite of superimposed individual output beams originating from facets having the same angle and having the same deviation angle from the input beam. The splitter optic 304 may redirect different portions of the input beam into different sets (a second set 310 and a third set 312) of output beams. The output beams of each of the second set 310 and the third set 312 sharing a common output angle, wherein each of the second set 310 and the third set 312 function as that described in the first variation. In another variation, the splitter acts as a diffractive beamsplitter with a microstructure designed to allocate specific percentages of the input power to the zeroth and first diffractive orders, or additionally or alternatively to higher orders. However, the splitter optic 304 can operate in any suitable manner.

In a first example, the splitter optic 304 functions as a refractive beam splitter (e.g., array beam generator), or may function as a 1-directional refractive beam splitter (e.g., vertical beam splitter that splits an input beam into multiple output beams separated along a y-axis) but can alternatively be any other suitable beam splitter. In a second example, the splitter optic 304 can function as a prismatic or lenticular array with super-wavelength spacing. However, the splitter optic 304 can form any other suitable system.

Examples of materials that can be used to construct the splitter optic 304 include: polycarbonate, polystyrene, cured UV resin, other optical polymer, fused silica, ZnSe, Ge, Si, GaP, sapphire, glass, or any suitable material. The splitter optic 304 can optionally include coatings, such as antireflective coatings (e.g., laser line coatings), on all or a portion of the splitter optic (e.g., the substrate only, the angled surfaces only, the non-angled surfaces only, all surfaces, etc.). The splitter optic 304 may optionally be made from a combination of materials, such as a planar substrate of a first material with laminated secondary material(s) defining the splitter structure(s) on one or both sides. However, the splitter optic 304 can be made from any other suitable material.

The splitter optic 304 may include a substrate and a microstructure but can be otherwise constructed. The splitter optic 304 can optionally include a secondary, sub-wavelength grating, which can function to spectrally disperse the input beam. However, the splitter optic 304 can include any suitable set of components to provide additional functionality.

Figure 19:
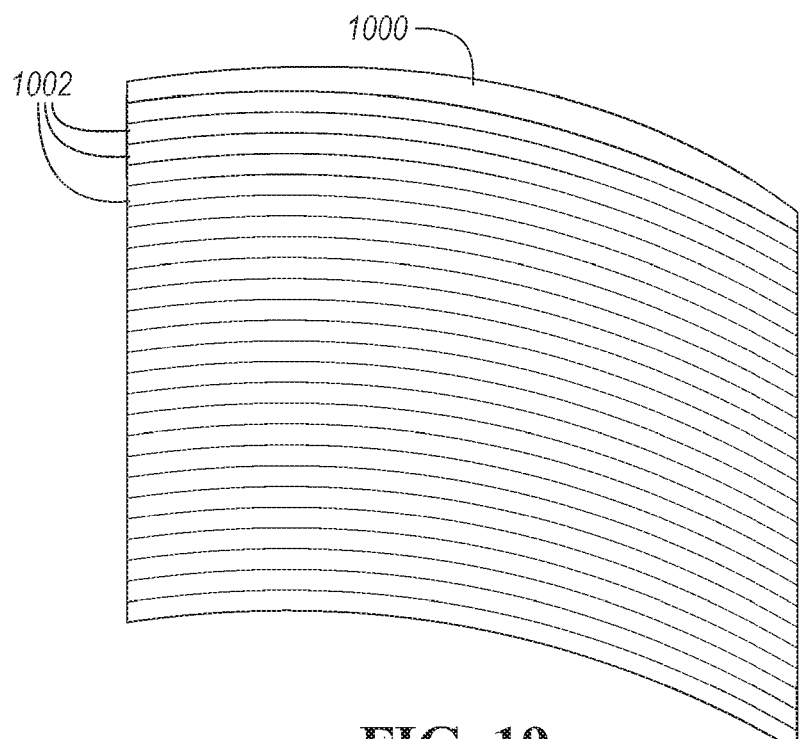
FIG. 19 is an isometric view of an example of a splitting optic.

Referring to FIG. 19, the substrate 1000 may function to support or define the microstructure 1002. The substrate's optical properties may be substantially uniform throughout but can alternatively vary as a function of thickness (e.g., wherein the substrate is formed from multiple stacked layers with different optical properties), radial position (e.g., from a centerpoint), height, width, or vary in any other suitable manner. The substrate 1000, in combination with any laminated material(s), may be transparent to the input beams' wavelengths (e.g., pass through more than a predetermined percentage of perpendicular-incident light, such as 90%, 99%, etc.), but can alternatively be translucent or opaque. The substrate's refractive index may be within a predetermined range (e.g., 1%, 5%, etc.) of the refractive index of the microstructure and/or ambient media (e.g., air, at approximately 1), but can alternatively be higher or lower. In one example, the substrate's refractive index may be approximately 1.6. The substrate surface may be non-reflective but can alternatively be reflective. The substrate material 1000, in combination with any laminated material(s), may be configured to not absorb a significant proportion of the input beam (e.g., less than 10%, less than 5%, etc.), but can alternatively absorb any suitable proportion of the beam or be constructed to absorb or attenuate only certain wavelengths. The substrate material 1000, in combination with any laminated material(s), may be configured to reflect a first predetermined portion of any or all split beams, while transmitting a second predetermined portion of the remaining split beams.

The substrate 1000 can be rigid, flexible (i.e., bendable), or have any other suitable mechanical property. The substrate 1000 may have a constant thickness throughout but can alternatively have a variable thickness. The input and output faces of the substrate 1000 may be parallel, but can alternatively be faces of an overall diverging lens, converging lens, or any other suitable lens. The substrate 1000 may be curved (e.g., concave, convex), example shown in FIG.

10, but can alternatively be flat or have any suitable geometry. The substrate 1000 can be aspherical, spherical, or have any suitable curvature. The substrate 1000 may be a cylindrical segment, but can alternatively be a full cylinder, a spherical segment, a sphere, or have any suitable geometry. In one example, the substrate 1000 can be concave toward the input beam (e.g., have a convex output face). The substrate 1000 may be integral with a more complex shape, such as a portion of a housing of a vehicle that contains the imaging system.

The substrate's overall radius of curvature may be selected based on the input beam width (e.g., be equal to or a predetermined percentage of the input beam's width at the substrate's position relative to the beam-generating optic, such as a spreading optic 20), but can alternatively be selected based on the desired irradiation area upon the splitter optic 22 (e.g., vary inversely as a function of the irradiation area), or otherwise determined. The radius of curvature may be substantially (e.g., multiple orders of magnitude) larger than the depth of the microstructure 1002 (e.g., etching depth) and/or height (e.g., molding height), but can alternatively be on the same order the non-angled facets, or have any suitable dimensionality. The substrate's height may be determined based on the desired height of the resultant beams (e.g., vary as a function of the desired height), but can alternatively be determined based on the height of the input beam (e.g., be shorter than the input beam height, be larger than the input beam height, etc.), or be otherwise determined. However, the substrate 1000 can have any suitable geometry.

In a first variation, the substrate 1000 can be constructed as a unitary piece with the microstructure 1002 formed directly (e.g., etched) into the substrate 1000. In a second variation, the substrate 1000 can function as a support material, wherein the microstructure 1002 is formed by protrusions mounted to the substrate 1000. In this variation, the walls of the protrusions can form the angled surfaces of the microstructure 1002. In a third variation, the substrate 1000 can be constructed from multiple stacked layers, wherein each layer can have different optical properties (e.g., index of refraction, etc.). One or more layers within the stack can be patterned to selectively generate the angled output beams. However, the substrate layers can have any other suitable combination of optical and/or mechanical properties. However, the substrate 1000 can be otherwise constructed.

The microstructure 1002 functions to selectively refract, reflect, or diffract portions of the input beam into one or more output beams. The microstructure 1002 can be made by etching or cutting the pattern into a substrate 1000, building the structure up (e.g., fabricating the pattern) onto a substrate 1000, casting or molding the pattern with the substrate 1000, or otherwise manufactured. The splitter optic can include one or more microstructures 1002, wherein multiple microstructures 1002 can be: interlaced, stacked (e.g., in an array), or otherwise arranged. Microstructures may be formed on both sides of the substrate 1000 to act serially on the input beam. The microstructure may be diffractive or prismatic faceted.

The microstructure 1002 may include multiple instances of a cyclically repeated subpattern 321, example shown in FIG. 12, but can alternatively include one or more instances of multiple subpatterns (e.g., when more than two angled beams are desired or overlapping bands with different irradiance at an illuminated target are desired). For example, a subpattern 321 can be on the order of 0.1 mm-0.5 mm high (e.g., 2 to 10 repetitions per mm), but can have any suitable dimensionality or frequency (e.g., height less than 0.1 mm or greater than 1.0 mm). The subpattern 321 may be a predetermined number of times smaller than the overall splitter optics dimensions (e.g., less than 1/10 the height of the splitter optic) but can have any suitable relative dimensionality. Different subpatterns can have angled surfaces arranged at different angles, angled surfaces separated by different etching transition lengths, angled surfaces with different curvatures, or differ in any other suitable manner. In one variation, the subpattern 321 is repeated along the y-axis (e.g., along the splitter optic height). However, the subpattern 321 can be repeated along the x-axis of the splitter optic 304 or along any suitable direction. The microstructure subpattern may have practical dimensions of approximately millimeter scale or less.

The subpattern 321 functions to generate one or more sets 310, 312 of angled beams, wherein one or more beams sharing the same angle (e.g., 310A, 310B, 310C, 310D, 310E, 310F, 310G) can cooperatively form a light band. The subpattern 321 may have super-wavelength dimensions and may refract or reflect the input beam into the output beams of the sets 310, 312 (e.g., wherein the angle of the angled surfaces and material index of refraction, having a value of −1 for reflection, dictate the output beam angle per Snell's Law). However, the subpattern 321 can alternatively diffract the input beam due to physical properties of the microstructure and optical wavelength (e.g. diffraction grating, Holographic Optical Element (HOE), or Holographic Diffuser), partially reflect the beam off the boundaries of stacked microstructures of different refractive indices (i.e., Fresnel reflection), or otherwise split the input beam. The subpattern height (d) can be determined based on scale of the system, illumination uniformity desired at target objects, manufacturing convenience, and stray-light issues, or be otherwise determined. The subpattern 321 can include one or more non-angled facets 316 alternating with one or more angled surfaces 318, 320 or can be otherwise constructed.

Figure 14:
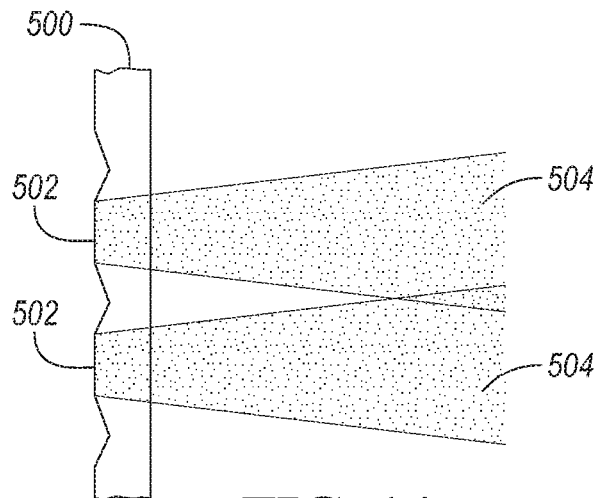
FIGS. 14-16 are examples of the splitting optic producing sheets from individual beams.

A non-angled facet 502 of the subpattern may function to allow unredirected continuation of the input beam through the substrate 500 (i.e., form an output beam at 0° to the input beam), example shown in FIG. 14. The non-angled facet 502 can also function to as a pattern transition, and separate adjacent subpatterns. The non-angled facet 502 can be formed by the space between adjacent subpatterns formed (e.g., cut or etched) into the substrate 500, be the flat top of a protrusion mounted to the substrate 500, or otherwise formed. The non-angled facet 502, in a y-axis cross-section, can be curved, straight, or have any suitable configuration. In cases where the non-angled facet 502 is not straight in the y-axis cross section, the surface can be concave, convex, freeform, or take any other suitable shape. In some configurations, the non-angled facet 502 has a curvature designed to diverge or converge (or to collimate or modify divergence/convergence if the input beam is divergent or convergent) the fraction of the output beam 504, allowing the elevational angular distribution of the light to be further controlled.

The relative height (i.e., duty cycle) of the non-angled facet 502 may be determined based on the desired proportion of the undeviated beam 504. In one variation, the height of the non-angled facet 502 varies as a function of the desired undeviated beam irradiance. The desired undeviated beam irradiance can be manually determined, automatically determined based on objects detected in the undeviated beam's path, or otherwise determined. In a second variation, the proportion of the microstructure's height that is occupied by the non-angled facet 502 (e.g., in aggregate) can be determined based on the proportion of the input beam's irradiance on the splitter optic allocated to the undeviated beam 504. In some variations, the proportion of the subpattern's surface area occupied by the non-angled facet 502 (e.g., individually, in aggregate) can be determined based on the proportion of the input beam's irradiance on the splitter optic allocated to the undeviated beam 504. However, the non-angled facet's relative or absolute dimensions can be otherwise determined.

Figure 15:
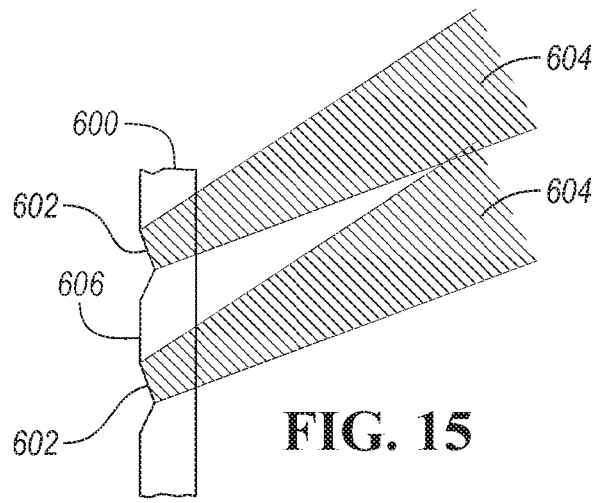
Figure 16:
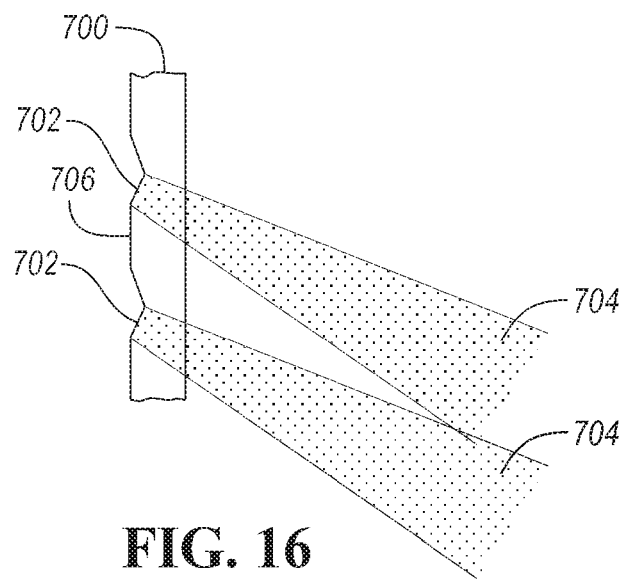

An angled surface or facet of the subpattern functions to redirect the input beam at a predetermined angle, which forms an angled output beam, examples shown in FIG. 15 and FIG. 16. Angled surfaces 602, 702 can optionally diffuse the input beam, which may form or increase diverging output beams 604, 704. The angled surface 602, 702 may be recessed relative to non-angled facets 606, 706 (e.g., into the substrate), but can alternatively be proud of the non-angled facets 606, 706 or otherwise arranged.

The angled surfaces 602, 702 may be cast onto the substrates 600, 700 in a direct-cure process, but can alternatively be formed into (e.g., cut or etched) the substrates 600, 700 or otherwise constructed. The angled surfaces 602, 702 may be defined relative to the non-angled facets 606, 706, wherein an internal angle extends from the non-angled facets 606, 706 to the angled surfaces 602, 702 through the substrate interior, but can alternatively be defined relative to the output face of the substrate, relative to the input beam vector, or defined relative to any other suitable reference point. At least one of the angled surfaces or non-angled facets may have diffusing or absorbing properties.

The internal angle between the non-angled facets 606, 706 and the angled surfaces 602, 702 can be determined (e.g., calculated by Snell's Law, selected, etc.) based on the desired angle of the angled output beams 604, 704 (e.g., relative to the input beam; deviation angle), based on the refractive index of the substrate and any overlay material(s), or otherwise determined. The internal angle may be measured from the flat surface contiguous with or proximal the angled surface, but can alternatively be measured from the input beam, or be otherwise measured. A desired angle can be manually determined, specified by the application (e.g., in a lookup table), or otherwise determined. In one variation, the internal angle can be defined as the desired angle plus 90°; or be defined as 180°, less the angled output beam's desired angle (example angles θ1, θ2, θ3, θ4 shown in FIG. 13). In a second variation, the internal angle can be the desired angle. In a third variation, the internal angle can be the desired angle, corrected by the substrate's refraction angle (e.g., adjusted upward or downward by the refraction angle). However, the internal angle can be otherwise determined. For example, the deviation angles may account for the substrate not being of uniform thickness.

Figure 17:
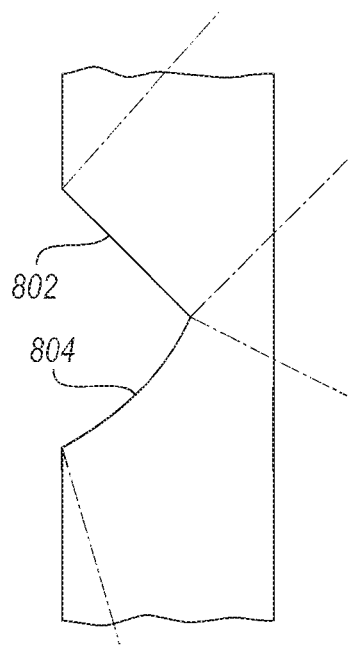
FIGS. 17 and 18 are examples of different etching cross-sections.
Figure 18:
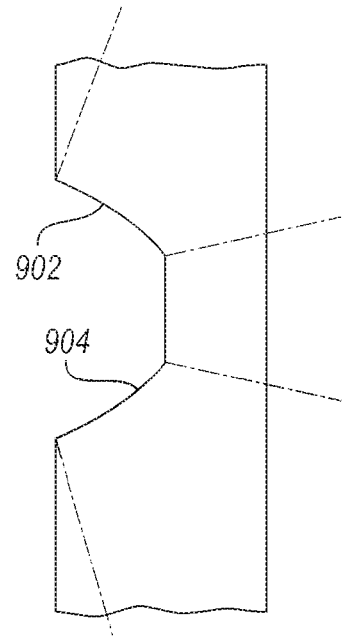

Angled surfaces 802, 804, 902, 904 may be straight in y-axis cross section, but can alternatively be convex, concave, or otherwise configured (examples shown in FIG. 17 and FIG. 18). A curvature of the angled surfaces 802, 804, 902, 904 may be aspherical but can alternatively be spherical. Such a curvature can be determined (e.g., calculated, selected) based on the wavelength of the input beam, based on the desired thickness of an individual beam at a specific target distance, based on the desired divergence or convergence, based on the convergence or divergence of the input beam, based on the desired proportion of light diverted toward the angled output beam, or otherwise determined.

The angled surfaces 802, 804, 902, 904 may include a depth. The depth can be defined along the input beam axis; perpendicular to the non-angled surface; or otherwise defined. In a first variation, the depth of the angled surfaces 802, 804, 902, 904 may be super-wavelength (e.g., multiples of the input beam's wavelength), but can alternatively be sub-wavelength, or have any other suitable relationship to the input beam's wavelength. In a second variation, the depth of the angled surfaces 802, 804, 902, 904 can be on the order of the input beam's wavelength, adjusted for the substrate's index of refraction. In some variations (e.g., super-wavelength scale), the depth of the angled surfaces 802, 804, 902, 904 can be determined based on the desired proportion of light diverted toward the angled output beam, wherein the surface area of the angled surfaces 802, 804, 902, 904 can be determined based on the desired proportion of light diverted toward the angled beam, and the surface area of the angled surfaces 802, 804, 902, 904 dictates the depth of the angled surface. In this variation, the angled surfaces 802, 804, 902, 904 can be separated from an adjacent angled surface by a straight facet in a y-axis cross section, a masked surface, or by any other suitable surface. However, the angled surfaces 802, 804, 902, 904 can have any suitable geometry. In some variations (e.g., wavelength or sub-wavelength scale), the proportion of light diverted toward the angled beam may be determined based on the diffraction parameters.

Each subpattern may include the same number of angled surfaces 802, 804, 902, 904 as the number of desired angled output beams (e.g., 2 angled surfaces when 2 angled output beams are desired) but can include any suitable number of output beams. The angled surfaces 802, 804, 902, 904 can be arranged: individually (e.g., wherein the input face of the splitter optic can include serrations), in opposing pairs (e.g., when the output beam set includes a first and second angled output beam directed in opposing directions; wherein the input face of the splitter optic can include v-grooves or proud v-ridges), or in any suitable configuration. Different angled surfaces 802, 804, 902, 904 can have different dimensions, coatings, or other optical parameters. To avoid troublesome steps in the depth dimension (i.e., z-axis), the relative area between the angled facets may be dependent on the selected deviation angles, or vice versa the deviation angles may be dependent on the desired relative areas of multiple angled facets. In any variation with a single angled facet, the depth steps may be necessary unless the entire substrate is tilted. The steps between non-contiguous facets may produce unwanted stray light, cause light loss, and may make manufacture difficult.

In a first variation 300, the splitter optic 304 is configured to split an input beam into a set 308 of undeviated beams, a second set 310 of beams with a positive angle of deviation from the input beam, and a third set 312 of beams with a negative angle of deviation from the input beam (example shown in FIG. 12). In this variation, the microstructure includes a plurality of identical, repeating subpatterns 321, wherein each subpattern 321 includes: a non-angled surface 316 and a v-groove 314. The v-groove 314 can include a first 318 and a second 320 adjacent and contiguous angled surface, wherein the first angled surface 318 is oriented with an internal angle 322 (defined from the non-angled surface) equal to 90° plus the positive angle of separation, and the second angled surface 320 is oriented with an interior angle 324 (e.g., from the plane of the non-angled section 316) equal to 90° plus the magnitude of the negative angle of separation.

Figure 13:
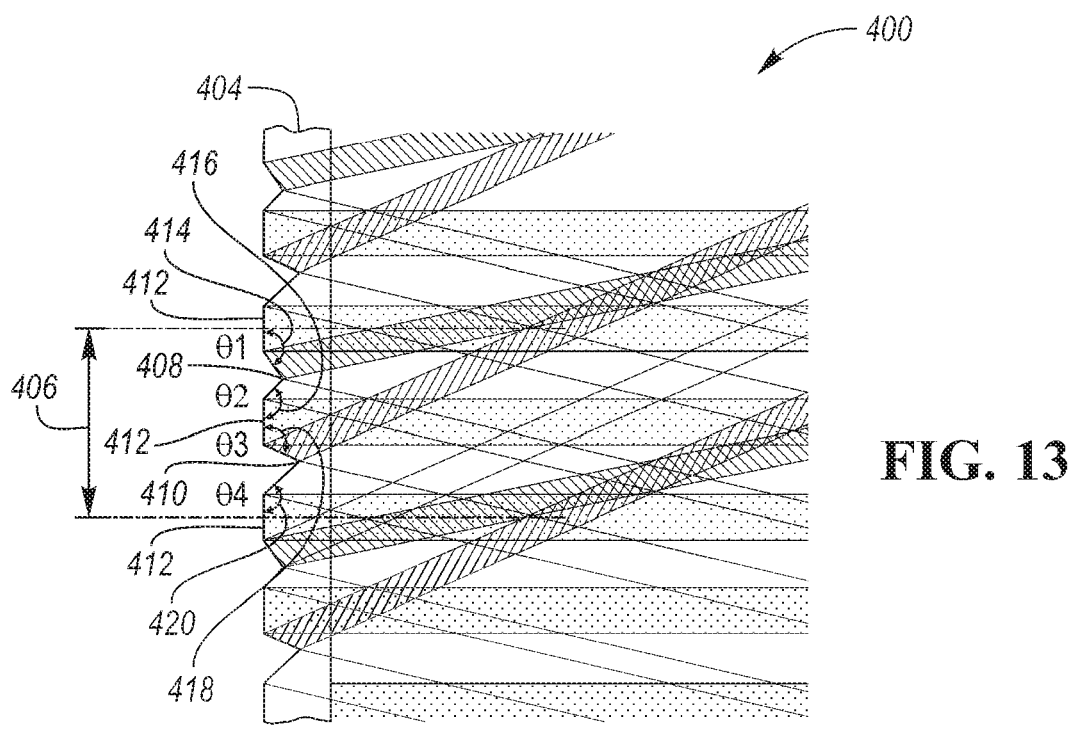
FIG. 13 is an example of the splitting optic configured to produce a passthrough beam, two beams at two positive angles, and two beams at two negative angles.

In a second variation 400, the splitter optic 404 is configured to redirect the input beam into three or more angled output beams, wherein the repeating subpattern 406 can include a set of non-angled surfaces 412 separating two or more v-grooves 408, 410 (example shown in FIG. 13). Each v-groove 408, 410 of the subpattern 406 can include a different set of angled surfaces (e.g., with different internal angles). In this variation, the occurrence frequency of a given angled surface appearing within the subpattern 406 may be determined based on the desired proportion of the input beam's intensity allocated to the resultant beam (and/or associated sheet) but can be otherwise determined. In one example, the splitter optic 404 can be configured with four angled facets with interior angles of: θ1, θ2, θ3, and θ4, wherein a subpattern 406 can include a first v-groove 408 having interior angles 414, 416; a second v-groove 410 having interior angles 418, 420; and a non-angled surface 412 separating the first 408 and second v-grooves 410. However, the splitter optic 404 can be otherwise configured.

3. Imaging System.

Imaging system 14 functions to record images of an illuminated scene 16. Imaging system 14 includes optical sensor 34 and lens 36, but can also include: a collector lens, an aperture stop, a filter, and/or any other suitable component.

Imaging system 14 may be used in optical system 34 that also illuminates scene 16 but can be used in any suitable application. Optical system 10 can include one or more imaging systems, wherein different imaging systems can be configured to capture different portions of an illuminated ambient scene. Each imaging system (e.g., including one or more lens or sensors) can be corrected within itself, and the entire group re-optimized as a unit. However, multiple imaging systems can be otherwise cooperatively used. The output of imaging system 14 can be used for: object detection, navigation, mapping, 3D reconstruction, or otherwise used. In one example, the output of imaging system 14 (e.g., the image, array of signal values, etc.) can be converted into a point cloud, wherein objects can be detected within the point cloud.

Imaging system 14 may be axially symmetric, but can be radially symmetric, asymmetric, or have any suitable symmetry. Imaging system 14 can be axially symmetric about a monitoring axis (e.g., the passthrough beam axis) or axially symmetric about an auxiliary axis. The auxiliary axis can extend perpendicular the passthrough beam axis, at any suitable angle to the passthrough beam axis, or be otherwise arranged.

A. Optical Sensor

Optical sensor 34 of imaging system 14 functions to capture an image created by lens 36 (e.g., convert light waves collected by lens 36 into sensor signals or current). Imaging system 10 can include one or more optical sensors. Optical sensor 34 can be connected to a processor (e.g., microprocessor, etc.) that controls optical sensor operation, a power source (e.g., a battery, such as a lithium chemistry battery, metal hydride battery, etc.), and other power electronics. Optical sensor 34 can be a CCD sensor, CMOS sensor, NMOS sensor, live MOS sensor, photodetector array, optical receiver, phase detector, or any other suitable sensor type. Optical sensor 34 can be a multispectral sensor, hyperspectral sensor, unispectral sensor (e.g., sensitive to an illumination beam's wavelength only), or be sensitive in any other suitable set of wavelengths. In a specific example, the optical sensor 34 is sensitive to wavelengths between 800 nm to 900 nm, more preferably 850 nm but alternatively any other suitable set of wavelengths.

B. Lens

Lens 36 of imaging system 14 functions to project a field of view of a scene onto a 2-dimensional format. Imaging system 14 may include a single lens, but can alternatively include a stack of lenses (e.g., the projected image is passed to a subsequent lens), a lens array, or include any suitable number of lenses of the same or different configuration arranged in any suitable arrangement.

Lens 36 may be a panoramic annular lens but can be any other suitable lens. The panoramic annular lens (PAL) functions to project a spherical field of view onto a two-dimensional annular format. The PAL can enlarge the system field of view (FOV), create an axially symmetric FOV (e.g., horizontally symmetric FOV), or confer any other suitable set of benefits.

The PAL may be axially symmetric, but can alternatively be axially asymmetric (e.g., horizontally, along an axis parallel the illumination axis). The PAL may be radially asymmetric but can alternatively be radially symmetric.

Figure 20:
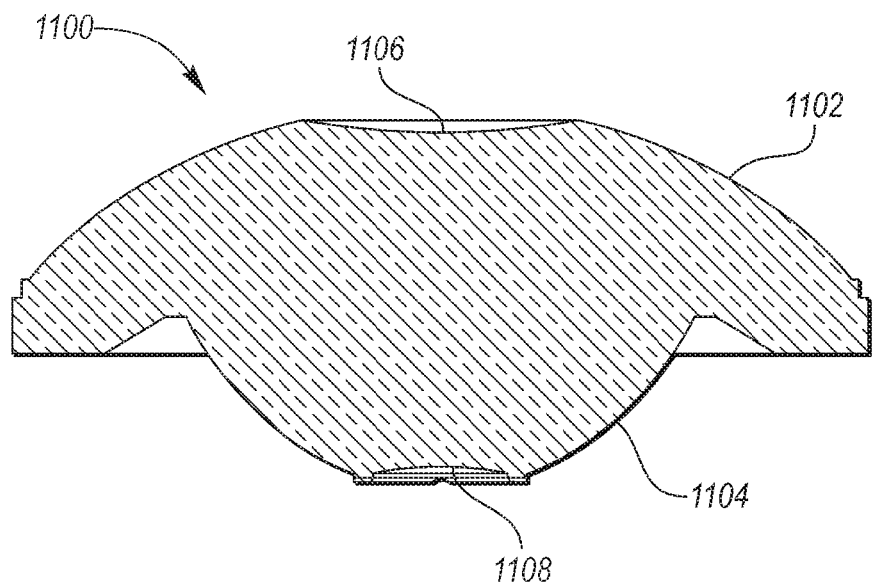
FIG. 20 is a cutaway view of an example panoramic lens (PAL).
Figure 21:
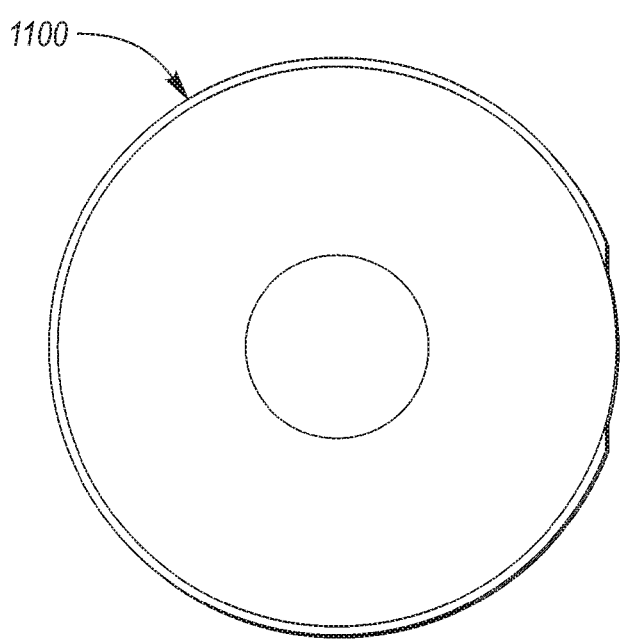
FIG. 21 is a plane view from the bottom of the example PAL.
Figure 22:
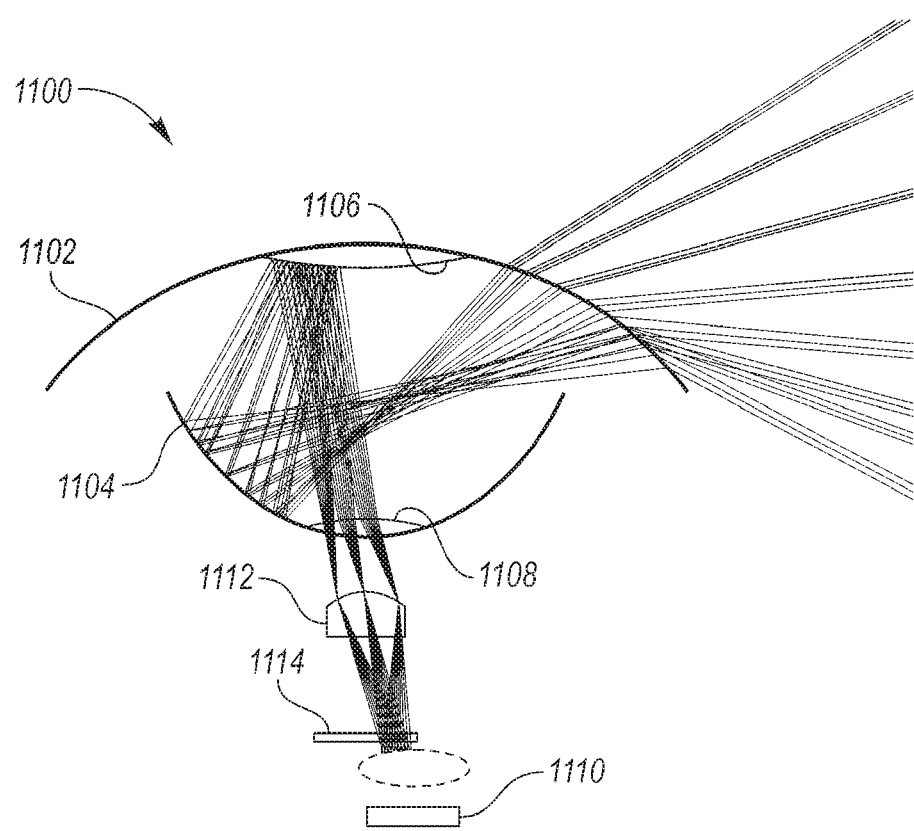
FIG. 22 is a ray trace of light travelling through an example imaging system.
Figure 23:
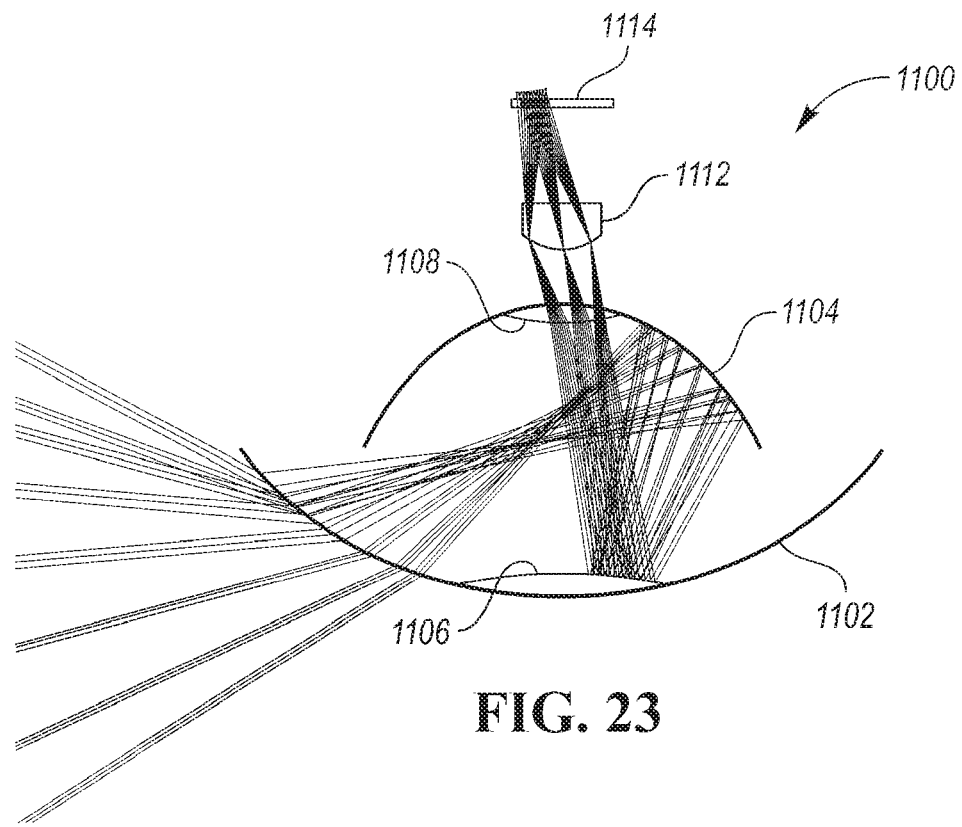
FIG. 23 is a ray trace of light travelling through a specific example of the PAL.

As shown in FIG. 20, PAL 1100 includes two refractive surfaces 1102 and 1108, and two reflective surfaces 1104 and 1106. As shown in FIG. 22, in operation, a set of input light rays are incident upon and refracted by first refractive surface 1102, are reflected by first reflective surface 1104, are reflected by second reflective surface 1106, and exit PAL 1100 through second refractive surface 1108 and travel toward optical sensor 1110. The input light rays can be collected from a predetermined angular range (e.g., measured from a plane intersecting first refractive surface 1102), a dynamically adjustable angular range (e.g., the curvature of first refractive surface 1102 is adjustable), or from any suitable angular range. In the embodiment shown in FIG. 23, the angular range is +35° to −28° but can alternatively be +60° to −60°, +35° to −25°, +32° to −28°, or any other suitable range.

PAL 1100 may be formed as a single block. For example, PAL 1100 can be made of optical grade polycarbonate, polystyrene, glass, or any other suitable transmissive material. The material can be broadly transparent or transparent to only selected wavelengths. In this variation, the refractive surfaces can be the interfaces between the material of PAL 1100 and the ambient environment, while the reflective surfaces can be formed into the block and coated with reflective coating. In one example, the reflective coating can be a material that reflects more than 95% of incident light at the illumination light's wavelength (e.g., between 800 nm to 900 nm, 840 nm to 869 nm, 850 nm, etc.), such as protected aluminum, enhanced aluminum, UV enhanced aluminum, DUV enhanced aluminum, bare gold, protected gold, and protected silver. However, any suitable reflective coating can be used.

Alternatively, PAL 1100 can be formed from multiple layers (e.g., planar layers, curved layers, etc.), wherein the interface between adjacent layers can form the refractive and/or reflective surfaces (e.g., wherein the interfaces can be coated, the adjacent layers can have different refraction indices, etc.).

First refractive surface 1102 functions to refract incoming light rays. First refractive surface 1102 can be curved, and in certain embodiments, externally convex, but can be otherwise configured. First refractive surface 1102 may be aspheric, but can alternatively be spheric, ellipsoidal, paraboidal, or otherwise structured. The conic constant of first refractive surface 1102 may be between −0.05 and +2.0, such as between −0.05 and −0.10, more preferably −0.86, but can alternatively have any suitable conic constant. The curvature of first refractive surface 1102 (first curvature) may be between 0.05 and 0.02, and in certain embodiments, 0.036, but can alternatively be any other suitable value. The radius of curvature of first refractive surface 1102 may be approximately 2× the radius of curvature of first reflective surface 1104, but can be otherwise related to other PAL surfaces, the illumination system dimensions (e.g., a splitter optic dimension, a spreading optic dimension, etc.), and/or any other suitable optical system component. In one example, the radius of curvature of first refractive surface 1102 can be 31.3491 mm. In this example, the outer diameter of the first refractive surface can range from 44.03 mm toward the center to 45.40 mm at the edge. In this example, the vertex thickness can be between 15 mm to 20 mm, such as 18.186 mm, or be any suitable thickness. In one variation, first refractive surface 1102 can include a step (e.g., chord) in the outer diameter, between first refractive surface 1102 and first reflective surface 1104. This step can enable PAL abutment to the housing (e.g., without introducing vignetting), or be otherwise used. In one example, the step can be 22 mm from the centerline of PAL 1100, and have a height of 16.52 mm, or have any suitable set of dimensions. In one variation, second reflective surface 1106 can be defined in the same side of the PAL as first refractive surface 1102, such as the center of first refractive surface 1102 (e.g., first refractive surface 1102 and second reflective surface 1106 are concentrically arranged). In this variation, first refractive surface 1102 can include an inner diameter. In one example, the inner diameter can range from 15.37 mm toward the center to 20.0 mm toward the edge. However, first refractive surface 1102 can have any other suitable radius of curvature or set of dimensions.

First reflective surface 1104 functions to reflect light, refracted by first refractive surface 1102, toward second reflective surface 1106. First reflective surface 1104 may be arranged opposing first refractive surface 1102 across the body of PAL 1100 but can be otherwise arranged. First reflective surface 1104 may be coaxially aligned with first refractive surface 1102 but can be offset or otherwise arranged. First reflective surface 1104 may be the interior surface of the bottom of PAL 1100 but can be otherwise defined. First reflective surface 1104 may be curved, and in some embodiments, internally concave, but can be otherwise configured. First reflective surface 1104 may be aspheric, but can alternatively be spheric, ellipsoidal, paraboidal, or otherwise structured. The exterior or interior of first reflective surface 1104 may be coated with a reflective coating but can be otherwise treated. The conic constant of first reflective surface 1104 may be 0 but can alternatively have any suitable conic constant. The curvature of first reflective surface 1104 (second curvature) is preferably between −0.1 and −0.05, and in some embodiments −0.068, but can alternatively be any other suitable value. The radius of curvature of first reflective surface 1104 may be approximately ½ the radius of curvature of first refractive surface 1102 but can be otherwise related to the other PAL surfaces, a dimension of illumination system 12 (e.g., a dimension of splitter optic 22, a dimension of spreading optic 20, etc.), and/or any other suitable optical system component. In one example, the radius of curvature of first reflective surface 1104 can be −14.608 mm. In this example, the outer diameter of first reflective surface 1104 can range from 26.6 mm at the center to 27.48 mm at the edge. In this example, the height of first reflective surface 1104 can be between 5 mm to 10 mm, such as 6.158 mm, or be any suitable height. In one variation, second refractive surface 1108 can be defined in the same side of PAL 1100 as first reflective surface 1104, such as in the center of first reflective surface 1104 (e.g., first reflective surface 1104 and second reflective surface 1106 are concentrically arranged). In this variation, first reflective surface 1104 can include an inner diameter. In one example, the inner diameter can range from 9.76 mm toward the center to 11.6 mm toward the edge. However, first reflective surface 1104 can have any other suitable radius of curvature or set of dimensions.

Second reflective surface 1106 functions to reflect light, reflected by first reflected surface 1104, toward second refractive surface 1108. Second reflective surface 1106 may be arranged opposing first refractive surface 1102 across the body of PAL 1100 but can be otherwise arranged. Second reflective surface 1106 may be coaxially aligned with first reflective surface 1104 but can be offset or otherwise arranged. Second reflective surface 1106 may be the interior central surface of the top of PAL 1100 (e.g., an externally concave portion of an upper section of PAL 1100) but can be otherwise defined. Second reflective surface 1106 may be curved, and in some embodiments, internally convex but can be flat or otherwise configured. Second reflective surface 1106 may be aspheric, but can alternatively be spheric, ellipsoidal, paraboidal, or otherwise structured. The exterior or interior of second reflective surface 1106 may be coated with a reflective coating but can be otherwise treated. The conic constant of second reflective surface 1106 may be 0, but can alternatively have any suitable conic constant. The curvature of second reflective surface 1106 (third curvature) may be between 0.05 and 0.1, and in certain embodiments −0.069655, but can alternatively be any other suitable value. The curvature of second reflective surface 1106 may be substantially similar to the curvature of first reflective surface 1104 but can be otherwise related to the other PAL surfaces, a dimension of illumination system (e.g., a dimension of splitter optic 22, a dimension of spreading optic 20, etc.), and/or any other suitable optical system component. In one example, the radius of curvature of second reflective surface 1106 can be −41.936 mm. In this example, the outer diameter of second reflective surface 1106 can range from 13.4 mm toward the center to 15.13 mm toward the edge (e.g., be 33% of the diameter of first refractive surface 1102). However, second reflective surface 1106 can have any other suitable radius of curvature or set of dimensions.

Second refractive surface 1108 functions to refract light, reflected by second reflective surface 1106, out of PAL 1100. Second refractive surface 1108 may refract light at an angle (e.g., 45°, 30° to the central axis of PAL and/or the central axis of second refractive surface 1108 but can be otherwise configured. Second refractive surface 1108 may be arranged opposing second reflective surface 1106 across the body of PAL 1100 but can be otherwise arranged. Second refractive surface 1108 can be coaxially aligned with second reflective surface 1106 but can be offset or otherwise arranged. Second refractive surface 1108 may be the interior surface of the bottom of PAL 1100 (e.g., an externally concave portion of the lower section of PAL 1100) but can be otherwise defined. Second refractive surface 1108 may be curved, and in some embodiments, internally convex, but can be otherwise configured. Second refractive surface 1108 may be aspheric, but can alternatively be spheric, ellipsoidal, paraboidal, or otherwise structured. The exterior or interior of second refractive surface 1108 may be coated with an anti-reflective coating but can be otherwise treated. The conic constant of second refractive surface 1108 may be 0 but can alternatively have any suitable conic constant. The curvature of second refractive surface 1108 (second curvature) may be between 0.01 and 0.05, and in certain embodiments, 0.0158, but can alternatively be any other suitable value. The radius of curvature of second refractive surface 1108 may be approximately a fourth the radius of curvature of second reflective surface 1106 but can be otherwise related to the other PAL surfaces, a dimension of illumination system 12

(e.g., a dimension of splitter optic 22, a dimension of spreading optic 20, etc.), and/or any other suitable optical system component. In one example, the radius of curvature of second refractive surface 1108 can be 14.357 mm. In this example, the outer diameter of second refractive surface 1108 can range from 6.2 mm at the center to 7.61 mm at the edge. However, second refractive surface 1108 can have any other suitable radius of curvature or set of dimensions.

Imaging system 14 may include a collector lens, which functions to form real images of internal points refracted by first refractive surface 1102 and converge the divergent rays leaving second refractive surface 1108. Imaging system may include one or more collector lenses of the same or different type, arranged in an array, a stack, or in any other suitable configuration. The collector lens may be a biconvex lens but can be any other suitable lens. The collector lens may be located between PAL 1100 and optical sensor 1110, and in certain embodiments, between aperture 1112 and filter 1114 (e.g., aperture 1112 is arranged between PAL 1100 and filter 1114) but can alternatively be arranged between PAL 1100 and aperture 1112, between filter 1114 and optical sensor 1110, or be arranged in any suitable location.

Imaging system 14 may include aperture stop 1112, which functions to adjust the cone angle of the diverging rays refracted by second refractive surface 1108. Aperture 1112 may be small (e.g., 3 to 10 mm, 4.3 mm, etc.), but can alternatively be any suitable size. Aperture 1112 may be arranged close to second refractive surface 1108 (e.g., within 10 mm, 20 mm, etc.), but can be arranged at any suitable position relative to second refractive surface 1108. Aperture 1112 can be coaxially aligned with second refractive surface 1108 but can be offset from second refractive surface 1108 or otherwise arranged. Aperture 1112 may be static, but can alternatively be adjustable (e.g., vary as a function of ambient light, application, etc.).

Imaging system 14 may include filter 1114, which functions to selectively transmit rays having a predetermined set of optical properties (e.g., wavelength, polarity, etc.). Filter 1114 is preferably arranged after aperture 1112 but can be otherwise arranged. Filter 1114 may be coaxially aligned with aperture 1112 but can be otherwise arranged. Filter 1114 may be a wavelength filter and selects for the input beam's wavelength (e.g., to reduce signal noise), but can alternatively be any other suitable filter. The wavelength filter can be a band-pass filter matched to the emitted wavelength, be a low-pass filter, or be any other suitable filter. In a specific example, filter 1114 selectively permits transmission of 840 to 860 nm wavelength light through. However, any other suitable set of filters can be used.

The chief ray angles of the lens are preferably well matched within 10% to any microlens arrays that are part of or installed over optical sensor 34 but can be otherwise arranged. The axis of PAL 1100 can be centered on and perpendicular the microlens array but it can be offset, rotated, tilted, or be otherwise arranged. Image circle 1116 can underfill, overfill, or only partially overlap optical sensor 34.

The following applications are related to the present application: U.S. patent application Ser. No. 16/193,138, U.S. patent application Ser. No. 16/192,877, and U.S. patent application Ser. No. 16/193,867, all filed on Nov. 16, 2018. Each of the identified applications is incorporated by reference herein in its entirety.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical system comprising:
   a splitting optic configured to receive a light beam from a light source along a first axis and form a set of light bands radiating from the optical system at predetermined angles relative to the first axis to illuminate a scene, the splitting optic is arranged with a broad face, and the splitting optic includes a pattern extending perpendicular to the longitudinal axis across the broad face and repeating along an axis parallel to the longitudinal axis; and
   a lens configured to project a field of view of the scene into a two-dimensional format and having a central axis perpendicular to the first axis and offset along a direction of the central axis from the splitting optic; and
   an optical sensor arranged offset from the central axis of the lens to capture a segment of the field of view projected by the lens.

2. The optical system of claim 1 wherein the optical sensor is arranged offset from the central axis of the lens such that the segment is less than half of the field of view projected by the lens.

3. The optical system of claim 1 further comprising a divider extending between the splitting optic and the lens configured to block direct light transmission from the splitting optics to the lens.

4. The optical system of claim 1 wherein the two-dimensional format is an annular two-dimensional format.

5. The optical system of claim 1 wherein an exterior edge of the splitting optic is aligned with an exterior edge of the lens.

6. An optical system comprising:
   an electromagnetic (EM) wave emitter;
   a spreading optic configured to redirect EM waves from the EM wave emitter at a predetermined angle;
   a splitting optic configured to receive the redirected EM waves and radiate a set of EM wave bands at predetermined separation angles to illuminate a scene, the splitting optic is arranged with a broad face, and the splitting optic includes a pattern extending perpendicular to the longitudinal axis across the broad face and repeating along an axis parallel to the longitudinal axis; and
   an imaging system configured to image the scene encompassing the set of EM wave bands and including a lens and an optical sensor arranged offset from a central axis of the lens such that the optical sensor images a segment of a field of view projected by the lens.

7. The optical system of claim 6 wherein the EM wave emitter is configured to emit EM waves along a first axis.

8. The optical system of claim 7 wherein the predetermined angle is ninety degrees to the first axis.

9. The optical system of claim 8 wherein the central axis of the lens is arranged parallel to the first axis.

10. The optical system of claim 6 wherein the broad face is parallel to a longitudinal axis of the spreading optic.

11. The optical system of claim 6 wherein the splitting optic is curved relative to the spreading optic and a curvature of the splitting optic is less than a curvature of the spreading optic.

12. The optical system of claim 6 wherein magnitudes of the predetermined separation angles are different.

13. The optical system of claim 6 wherein the optical sensor is arranged offset from the central axis of the lens such that the segment is less than half of the field of view projected by the lens.

14. An optical system comprising:
- an electromagnetic (EM) wave emitter configured to emit EM waves along a first axis;
- a spreading optic configured to redirect the EM waves at a predetermined angle relative to the first axis to form a spread beam;
- a splitting optic configured to divide the spread beam into a plurality of beams separated by one or more separation angles to illuminate a scene segment, the splitting optic is arranged with a broad face, and the splitting optic includes a pattern extending perpendicular to the longitudinal axis across the broad face and repeating along an axis parallel to the longitudinal axis; and
- an imaging system configured to image a scene encompassing the beams and including a lens and an optical sensor arranged offset from a central axis of the lens such that the optical sensor images a segment of a field of view projected by the lens.

15. The optical system of claim 14 wherein the central axis of the lens is arranged parallel to the first axis.

16. The optical system of claim 15 wherein the imaging system is located at a vertical position below the splitting optic.

17. The optical system of claim 14 wherein the imaging system is arranged such that an exterior edge of the splitting optic is aligned with an exterior edge of the lens.

18. The optical system of claim 14 further comprising a divider extending between the splitting optic and the imaging system configured to block direct light transmission from the splitting optic to the lens.

19. The optical system of claim 14 wherein the optical sensor is arranged offset from the central axis of the lens such that the segment is less than half of the field of view projected by the lens.

20. The optical system of claim 14 wherein the broad face is parallel to a longitudinal axis of the spreading optic.

* * * * *